(12) United States Patent
Liu

(10) Patent No.: US 11,497,030 B2
(45) Date of Patent: Nov. 8, 2022

(54) CHANNEL QUALITY INFORMATION REPORTING METHOD AND APPARATUS

(71) Applicant: HUAWEI TECHNOLOGIES CO., LTD., Guangdong (CN)

(72) Inventor: Jianqin Liu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 261 days.

(21) Appl. No.: 16/704,599

(22) Filed: Dec. 5, 2019

(65) Prior Publication Data

US 2020/0112966 A1  Apr. 9, 2020

Related U.S. Application Data

(63) Continuation of application No. PCT/CN2018/090007, filed on Jun. 5, 2018.

(30) Foreign Application Priority Data

Jun. 6, 2017 (CN) .......................... 201710418246.4

(51) Int. Cl.
*H04W 72/08* (2009.01)
*H04L 5/00* (2006.01)
(Continued)

(52) U.S. Cl.
CPC ......... *H04W 72/085* (2013.01); *H04L 5/0051* (2013.01); *H04W 52/241* (2013.01); *H04W 72/0413* (2013.01)

(58) Field of Classification Search
None
See application file for complete search history.

(56) References Cited

U.S. PATENT DOCUMENTS 10,524,150 B2 * 12/2019 Moon .................. H04B 7/0695
10,979,945 B2 *  4/2021 Yoshizawa ...... H04W 36/00837
(Continued)

FOREIGN PATENT DOCUMENTS

CN        104184537 A      12/2014
CN        104956717 A       9/2015
(Continued)

OTHER PUBLICATIONS

3GPP TSG RAN WG1 Meeting #89, Hangzhou, PR China, May 15-19, 2017, NTT Docomo, "Discussion on NR RRM measurement based on CSI-RS for L3 mobility," R1-1708445.*
(Continued)

*Primary Examiner* — Andrew C Oh
(74) *Attorney, Agent, or Firm* — Womble Bond Dickinson (US) LLP

(57) ABSTRACT

This application discloses a channel quality information reporting method and apparatus, to resolve a prior-art problem that a communication link transmission failure is caused due to movement of user equipment. The method includes: sending, by a network device, P1 first reference signals to user equipment on a first reference signal resource, and sending P2 second reference signals to the user equipment on a second reference signal resource; performing, by the user equipment, channel quality measurement on the received first reference signal and the received second reference signal; and reporting, by the user equipment to the network device, M reference signal resource indexes, channel quality information corresponding to the M reference signal resource indexes, and reference signal types or reference signal resource set indexes corresponding to the M reference signal resource indexes.

18 Claims, 3 Drawing Sheets

(51) Int. Cl.
*H04W 52/24* (2009.01)
*H04W 72/04* (2009.01)

(56) References Cited

U.S. PATENT DOCUMENTS

| | | | |
|---|---|---|---|
| 2010/0137017 A1* | 6/2010 | Lin | H04L 5/0007 455/522 |
| 2012/0182895 A1* | 7/2012 | Jwa | H04L 5/0048 370/252 |
| 2013/0039199 A1* | 2/2013 | Liao | H04B 7/024 370/252 |
| 2013/0148538 A1* | 6/2013 | Ohwatari | H04J 11/005 370/252 |
| 2013/0194961 A1* | 8/2013 | Kang | H04B 7/0473 370/252 |
| 2013/0195025 A1* | 8/2013 | Chatterjee | H04B 7/024 370/329 |
| 2013/0223548 A1* | 8/2013 | Kang | H04B 7/0478 375/260 |
| 2014/0010129 A1* | 1/2014 | Rubin | H04J 11/0056 370/328 |
| 2014/0050280 A1* | 2/2014 | Stirling-Gallacher | H04B 7/0665 375/296 |
| 2014/0211656 A1* | 7/2014 | Hu | H04B 17/318 370/252 |
| 2014/0269576 A1 | 9/2014 | Nogami et al. | |
| 2014/0349656 A1* | 11/2014 | Sfar | H04W 36/36 455/437 |
| 2015/0010112 A1* | 1/2015 | Liu | H04B 17/309 375/316 |
| 2015/0257130 A1* | 9/2015 | Lee | H04L 5/1469 370/336 |
| 2015/0312927 A1* | 10/2015 | Ko | H04W 72/1231 370/336 |
| 2015/0319718 A1* | 11/2015 | Yang | H04W 52/40 370/252 |
| 2015/0326369 A1 | 11/2015 | Kim et al. | |
| 2016/0006547 A1* | 1/2016 | Kang | H04B 7/0413 370/329 |
| 2016/0135194 A1* | 5/2016 | Kim | H04L 5/0048 370/329 |
| 2016/0205715 A1* | 7/2016 | Seo | H04W 76/14 370/329 |
| 2016/0344519 A1* | 11/2016 | Lin | H04L 5/0051 |
| 2017/0026979 A1* | 1/2017 | Dimou | H04W 24/08 |
| 2017/0188371 A1* | 6/2017 | Kim | H04L 5/005 |
| 2017/0339675 A1* | 11/2017 | Liu | H04W 72/042 |
| 2018/0020363 A1* | 1/2018 | Faxér | H04W 72/082 |
| 2018/0109304 A1* | 4/2018 | Wiberg | H04B 7/0639 |
| 2018/0115389 A1 | 4/2018 | Chen et al. | |
| 2018/0219605 A1* | 8/2018 | Davydov | H04B 7/0862 |
| 2019/0013857 A1* | 1/2019 | Zhang | H04W 74/04 |
| 2019/0028176 A1* | 1/2019 | Zhang | H04L 5/0023 |
| 2019/0098638 A1* | 3/2019 | Kakishima | H04L 5/0048 |
| 2019/0182697 A1* | 6/2019 | Zhang | H04W 24/10 |
| 2019/0363910 A1* | 11/2019 | Ugurlu | H04W 24/06 |
| 2022/0038169 A1* | 2/2022 | Ma | H04W 24/10 |

FOREIGN PATENT DOCUMENTS

| | | |
|---|---|---|
| CN | 105991231 A | 10/2016 |
| EP | 2941041 A1 | 11/2015 |
| EP | 3605866 A1 | 2/2020 |
| WO | 2014117352 A1 | 8/2014 |
| WO | 2016134537 A1 | 9/2016 |

OTHER PUBLICATIONS

ZTE, "Discussion on beam recovery mechanism",3GPP TSG RAN WG1 Meeting #89 ,R1-1707121,Hangzhou, P.R. China May 15-19, 2017,total 8 pages.

NTT Docomo, INC.,"Discussion on NR RRM measurement based on CSI-RS for L3 mobility",3GPP TSG RAN WG1 Meeting #89,R1-1708445,Hangzhou, P.R. China, May 15-19, 2017, total 10 pages.

* cited by examiner

CHANNEL QUALITY INFORMATION REPORTING METHOD AND APPARATUS

CROSS-REFERENCE TO RELATED APPLICATIONS

This application is a continuation of International Application No. PCT/CN2018/090007, filed on Jun. 5, 2018, which claims priority to Chinese Patent Application No. 201710418246.4, filed on Jun. 6, 2017. The disclosures of the aforementioned applications are hereby incorporated by reference in their entireties.

TECHNICAL FIELD

This application relates to the field of communications technologies, and in particular, to a channel quality information reporting method and apparatus.

BACKGROUND

A beamforming technology is a signal preprocessing technology based on an antenna array. A directional beam is generated by adjusting a weighting coefficient of each array element in the antenna array, to compensate for a propagation loss of a signal (especially a high frequency signal) in a propagation process by using a relatively large antenna gain.

In a downlink signal transmission process, both beamforming on a transmit side of a network device and beamforming on a receive side of user equipment may dynamically change. To track a beamforming change, the network device usually configures N (N>1) candidate shaped beams for the user equipment. The network device sends channel state information-reference signals (Channel State Information Reference Signal, CSI-RS) to the user equipment on the N shaped beams, and the user equipment performs channel quality measurement on the CSI-RSs on the N shaped beams, obtains T (N≥T≥1) shaped beams with better beam quality based on a measurement result, and reports the T shaped beams to the network device. During downlink signal transmission, the network device may send a downlink signal on the T shaped beams with better beam quality that are reported by the user equipment.

In the foregoing manner, because the N shaped beams cannot cover all directions to which the user equipment probably moves, the movement of the user equipment causes the following problems: When the user equipment performs channel quality measurement on the CSI-RSs on the N shaped beams, beam quality of N CSI-RSs is all poor and cannot meet a signal transmission requirement. Consequently, the user equipment cannot select a shaped beam with better beam quality through screening or report the shaped beam to the network device, thereby causing a communication link transmission failure.

In view of the above, in the solution provided in the prior art, due to the movement of the user equipment, the user equipment cannot select a shaped beam with better beam quality through screening or report the shaped beam to the network device, thereby causing a communication link transmission failure.

SUMMARY

This application provides a channel quality information reporting method and apparatus, to resolve a prior-art problem that a communication link transmission failure is caused due to movement of user equipment.

According to one embodiment, this application provides a channel quality information reporting method, and the method includes the following blocks: receiving, by user equipment, P1 first reference signals sent by a network device on a first reference signal resource and P2 second reference signals sent by the network device on a second reference signal resource, where P1≥1 and P2≥1; and performing, by the user equipment, channel quality measurement on the first reference signal and the second reference signal, and reporting, to the network device based on a channel quality measurement result, M reference signal resource indexes, channel quality information corresponding to the M reference signal resource indexes, and reference signal types or reference signal resource set indexes corresponding to the M reference signal resource indexes, where M≥1.

The first reference signal resource corresponds to a plurality of shaped beams, and directions of the shaped beams are different. The network device sends the P1 first reference signals to the user equipment on the first reference signal resource, that is, sends the first reference signals to the user equipment in P1 different beam directions. Similarly, the second reference signal resource also corresponds to a plurality of shaped beams, and directions of the shaped beams are different. The network device sends the P2 second reference signals to the user equipment on the second reference signal resource, that is, sends the second reference signals to the user equipment in P2 different beam directions.

According to one embodiment, the user equipment performs channel quality measurement on the P1 first reference signals and the P2 second reference signals sent by the network device, and reports, based on the channel quality measurement result, the M reference signal resource indexes, the channel quality information corresponding to the M reference signal resource indexes, and the reference signal types or the reference signal resource set indexes corresponding to the M reference signal resource indexes. Therefore, the network device may determine, based on the foregoing information reported by the user equipment, which shaped beams are specifically M shaped beams selected by the user equipment from P1 candidate shaped beams (corresponding to the P1 first reference signals) and/or P2 candidate shaped beams (corresponding to the P2 second reference signals), and further use one of the M shaped beams as a serving shaped beam of the user equipment. When downlink transmission is subsequently performed, a downlink signal is sent to the user equipment on the serving shaped beam, to compensate for a propagation loss of a signal (especially a high frequency signal) in a propagation process by using a relatively large antenna gain.

In addition, in one embodiment, the user equipment reports the channel quality information based on two types of reference signals: the first reference signal and the second reference signal. In comparison with a solution in the prior art in which channel quality information is reported based on only a CSI-RS, when the user equipment moves beyond a coverage range of one specific type of reference signal (the first reference signal or the second reference signal), the user equipment can still select the M shaped beams with better beam quality based on the other type of reference signal (the second reference signal or the first reference signal) and report the M shaped beams. Therefore, in the foregoing method, when the user equipment moves, the user equipment can still select a shaped beam with better beam quality through screening and report the shaped beam, thereby avoiding a communication link transmission failure.

In particular, when the first reference signal is a user-specific reference signal and the second reference signal is a cell-specific reference signal, because the cell-specific reference signal can cover all directions in a cell, regardless of a direction that is in the cell and to which the user equipment moves, the user equipment can select the M shaped beams with better beam quality from the P2 candidate shaped beams (corresponding to the P2 second reference signals) through screening and report the M shaped beams, thereby avoiding a communication link transmission failure.

In one embodiment, the channel quality information corresponding to the reference signal resource index includes at least one of the following:

reference signal received power (Reference Signal Received Power, RSRP); and reference signal received quality (Reference Signal Received Quality, RSRQ).

In one embodiment, the user equipment may specifically report, to the network device, the M reference signal resource indexes, the channel quality information corresponding to the M reference signal resource indexes, and the reference signal types or the reference signal resource set indexes corresponding to the M reference signal resource indexes in the following manner: When a difference between channel quality corresponding to the first reference signal and channel quality corresponding to the second reference signal is greater than or equal to a first threshold, the user equipment selects M first reference signals from the P1 first reference signals, and reports M first reference signal resource indexes, channel quality information corresponding to the M first reference signal resource indexes, and reference signal types or reference signal resource set indexes of the M first reference signals; or when a difference between channel quality corresponding to the second reference signal and channel quality corresponding to the first reference signal is greater than or equal to a second threshold, the user equipment selects M second reference signals from the P2 second reference signals, and reports M second reference signal resource indexes, channel quality information corresponding to the M second reference signal resource indexes, and reference signal types or reference signal resource set indexes of the M second reference signals.

In one embodiment, the user equipment reports only a channel quality measurement result based on one type of reference signal, so that reporting overheads of the user equipment can be reduced.

In addition, in one embodiment, the user equipment may further report, to the network device, a reference signal type or a reference signal resource set index based on which power control of the user equipment is performed. After learning of the reference signal type or the reference signal resource set index based on which power control of the user equipment is performed, the network device may further control transmit power of the user equipment.

In one embodiment, the user equipment may specifically report, to the network device, the M reference signal resource indexes, the channel quality information corresponding to the M reference signal resource indexes, and the reference signal types or the reference signal resource set indexes corresponding to the M reference signal resource indexes in the following manner: the user equipment selects M1 first reference signals from the P1 first reference signals and selects M2 second reference signals from the P2 second reference signals, where $1 \leq M1 \leq P1$, $1 \leq M2 \leq P2$, and M=M1+M2; and the user equipment reports the following information to the network device: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes.

In one embodiment, the user equipment may report channel quality measurement results of two types of reference signals based on configuration of the network device, to meet a configuration requirement of the network device.

To reduce reporting overheads of the user equipment, it may be specified that the user equipment reports the channel quality measurement results of the two types of reference signals based on a unified reporting format. Solutions for unifying reporting formats of the channel quality measurement results of the two types of reference signals include but are not limited to the following two solutions:

Solution 1

Before the user equipment performs channel quality measurement on the first reference signal and the second reference signal, the user equipment may further receive a first notification message sent by the network device, where the first notification message is used to indicate a first measurement time window in which the user equipment receives the first reference signal; or the user equipment receives a second notification message sent by the network device, where the second notification message is used to indicate a second measurement time window in which the user equipment receives the second reference signal.

In one embodiment, when the network device may indicate, by using the first notification message, the first measurement time window in which the user equipment receives the first reference signal, the user equipment may receive the first reference signal in the first measurement time window, so that the quantity P1 of first reference signals received in the first measurement time window is the same as or close to the quantity P2 of second reference signals received in the first measurement time window. In this case, a quantity of reporting bits of the first reference signal resource index may be the same as a quantity of reporting bits of the second reference signal resource index. When the network device may indicate, by using the second notification message, the second measurement time window in which the user equipment receives the second reference signal, the user equipment may receive the second reference signal in the second measurement time window, so that the quantity P2 of second reference signals received in the second measurement time window is the same as or close to the quantity P1 of first reference signals received in the second measurement time window. In this case, a quantity of reporting bits of the first reference signal resource index may be the same as a quantity of reporting bits of the second reference signal resource index. In Solution 1, the quantity of reporting bits of the first reference signal resource index and the quantity of reporting bits of the second reference signal resource index are unified, thereby reducing reporting overheads of the user equipment.

Solution 2

Before the user equipment performs channel quality measurement on the first reference signal and the second reference signal, the user equipment may further receive a third notification message sent by the network device, where the third notification message is used to indicate a second reference signal measurement subset used by the user equipment to perform channel quality measurement on the second reference signal, and the second reference signal measurement subset includes a part of the P2 second reference signals. The performing, by the user equipment, channel quality measurement on the second reference signal specifically includes: performing, by the user equipment, channel quality measurement on the second reference signal measurement subset.

In one embodiment, when the first reference signal is a user-specific reference signal and the second reference signal is a cell-specific reference signal, a quantity of reporting bits of the first reference signal resource index is usually less than a quantity of reporting bits of the second reference signal resource index. Therefore, to unify the quantity of reporting bits of the first reference signal resource index and the quantity of reporting bits of the second reference signal resource index, the network device may instruct the user equipment to perform channel quality measurement on only a part of the received P2 second reference signals, so that a quantity of second reference signals on which channel quality measurement is performed is the same as or close to a quantity of first reference signals on which channel quality measurement is performed. In this case, the quantity of reporting bits of the second reference signal resource index may be the same as the quantity of reporting bits of the first reference signal resource index. In Solution 2, the quantity of reporting bits of the first reference signal resource index and the quantity of reporting bits of the second reference signal resource index are unified, thereby reducing reporting overheads of the user equipment.

In one embodiment, the user equipment may further receive a fourth notification message sent by the network device, where the fourth notification message is used to indicate the reference signal type or the reference signal resource set index based on which power control of the user equipment is performed.

In one embodiment, the fourth notification message may be used by the user equipment to set or adjust transmit power based on the reference signal type or the reference signal resource set index when the user equipment sends an uplink signal to the network device.

In one embodiment, the user equipment may further receive indication information sent by the network device, where the indication information is used to indicate a reference signal type or a reference signal resource set index corresponding to a quasi-co-location (Quasi-Co-Location, QCL) assumption indication configured by the network device.

The QCL assumption indication may be used to assist in describing beamforming information on a receive side of the user equipment and a receiving procedure of the user equipment.

In one embodiment, when the reference signal type corresponding to the QCL assumption indication is a user-specific reference signal, the user equipment receives data based on shaped beams corresponding to the reported M1 first reference signals in a subsequent data receiving process. Otherwise, the user equipment receives data based on shaped beams corresponding to the reported M2 second reference signals.

In addition, to reduce overheads of the QCL assumption indication sent by the network device to the user equipment, in the QCL assumption indication sent by the network device to the user equipment, a valid time window corresponding to the QCL assumption indication sent by the network device to the user equipment may be specified. One of M shaped beam pairs reported by the user equipment in S204 meets a QCL assumption.

In one embodiment, the reporting, by the user equipment, channel quality information corresponding to the M reference signal resource indexes specifically include: reporting, by the user equipment, channel quality information of L reference signal resource index groups based on the channel quality information corresponding to the M reference signal resource indexes, where L≥1.

Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

In one embodiment, the user equipment may report the channel quality information corresponding to the M reference signal resource indexes through grouping, thereby reducing resource overheads for reporting the channel quality information corresponding to the M reference signal resource indexes.

In addition, when reporting is performed through grouping, the user equipment may further report, to the network device, the beam group types corresponding to the L reference signal resource index groups.

According one embodiment, this application provides a channel quality information reporting method, and the method includes the following blocks: sending, by a network device, P1 first reference signals to user equipment on a first reference signal resource, and sending P2 second reference signals to the user equipment on a second reference signal resource, where P1≥1, P2≥1, and the first reference signal and the second reference signal are used by the user equipment to perform channel quality measurement; and receiving, by the network device, the following information reported by the user equipment based on a channel quality measurement result: M reference signal resource indexes, channel quality information corresponding to the M reference signal resource indexes, and reference signal types or reference signal resource set indexes corresponding to the M reference signal resource indexes, where M≥1.

According to one embodiment, the user equipment performs channel quality measurement on the P1 first reference signals and the P2 second reference signals sent by the network device, and reports, based on the channel quality measurement result, the M reference signal resource indexes, the channel quality information corresponding to the M reference signal resource indexes, and the reference signal types or the reference signal resource set indexes corresponding to the M reference signal resource indexes. Therefore, the network device may determine, based on the foregoing information reported by the user equipment, which shaped beams are specifically M shaped beams selected by the user equipment from P1 candidate shaped beams (corresponding to the P1 first reference signals) and/or P2 candidate shaped beams (corresponding to the P2 second reference signals), and further use one of the M shaped beams as a serving shaped beam of the user equipment. When downlink transmission is subsequently performed, a downlink signal is sent to the user equipment on the serving shaped beam, to compensate for a propagation loss of a signal (especially a high frequency signal) in a propagation process by using a relatively large antenna gain.

In addition, in one embodiment, the user equipment reports the channel quality information based on two types of reference signals: the first reference signal and the second reference signal. In comparison with a solution in the prior art in which channel quality information is reported based on only a CSI-RS, when the user equipment moves beyond a coverage range of one specific type of reference signal (the first reference signal or the second reference signal), the user equipment can still select the M shaped beams with better beam quality based on the other type of reference signal (the second reference signal or the first reference signal) and report the M shaped beams. Therefore, according to the foregoing method, when the user equipment moves, the user equipment can still select a shaped beam with better beam quality through screening and report the shaped beam, thereby avoiding a communication link transmission failure.

In particular, when the first reference signal is a user-specific reference signal and the second reference signal is a cell-specific reference signal, because the cell-specific reference signal can cover all directions in a cell, regardless of a direction that is in the cell and to which the user equipment moves, the user equipment can select the M shaped beams with better beam quality from the P2 candidate shaped beams (corresponding to the P2 second reference signals) through screening and report the M shaped beams, thereby avoiding a communication link transmission failure.

In one embodiment, the channel quality information corresponding to the reference signal resource index includes at least one of the following:
reference signal received power; and reference signal received quality.

In one embodiment, the network device may specifically receive, in the following manner, the following information reported by the user equipment based on the channel quality measurement result: the M reference signal resource indexes, the channel quality information corresponding to the M reference signal resource indexes, and the reference signal types or the reference signal resource set indexes corresponding to the M reference signal resource indexes:
When a difference between channel quality corresponding to the first reference signal and channel quality corresponding to the second reference signal is greater than a first threshold, the network device receives the following information reported by the user equipment based on the channel quality measurement result: M first reference signal resource indexes, channel quality information corresponding to the M first reference signal resource indexes, and reference signal types or reference signal resource set indexes corresponding to the M first reference signal resource indexes; or when a difference between channel quality corresponding to the second reference signal and channel quality corresponding to the first reference signal is greater than a second threshold, the network device receives the following information reported by the user equipment based on the channel quality measurement result: M second reference signal resource indexes, channel quality information corresponding to the M second reference signal resource indexes, and reference signal types or reference signal resource set indexes corresponding to the M second reference signal resource indexes.

In one embodiment, the user equipment reports only a channel quality measurement result based on one type of reference signal, so that reporting overheads of the user equipment can be reduced.

In addition, in one embodiment, the network device may further receive a reference signal type or a reference signal resource set index that is reported by the user equipment and on which a power control parameter of the user equipment is based. After learning of the reference signal type or the reference signal resource set index based on which power control of the user equipment is performed, the network device may further control transmit power of the user equipment.

In one embodiment, the network device may specifically receive, in the following manner, the following information reported by the user equipment: the M reference signal resource indexes, the channel quality information corresponding to the M reference signal resource indexes, and the reference signal types or the reference signal resource set indexes corresponding to the M reference signal resource indexes:
the network device receives the following information reported by the user equipment: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes, where $1 \leq M1 \leq P1$, $1 \leq M2 \leq P2$, and $M=M1+M2$.

In one embodiment, the network device may instruct, based on a configuration requirement, the user equipment to report channel quality measurement results of two types of reference signals, and the user equipment may report the channel quality measurement results of the two types of reference signals based on configuration of the network device, to meet the configuration requirement of the network device.

To reduce reporting overheads of the user equipment, the network device may instruct the user equipment to report the channel quality measurement results of the two types of reference signals based on a unified reporting format. Specific implementation solutions include but are not limited to the following two solutions:

Solution 1

The network device sends a first notification message to the user equipment, where the first notification message is used to indicate a first measurement time window in which the user equipment receives the first reference signal; or the network device sends a second notification message to the user equipment, where the second notification message is used to indicate a second measurement time window in which the user equipment receives the second reference signal.

In one embodiment, when the network device may indicate, by using the first notification message, the first measurement time window in which the user equipment receives the first reference signal, the user equipment may receive the first reference signal in the first measurement time window, so that the quantity P1 of first reference signals received in the first measurement time window is the same as or close to the quantity P2 of second reference signals received in the first measurement time window. In this case, a quantity of reporting bits of the first reference signal resource index may be the same as a quantity of reporting bits of the second reference signal resource index. When the network device may indicate, by using the second notification message, the second measurement time window in which the user equipment receives the second reference signal, the user equipment may receive the second reference signal in the second measurement time window, so that the quantity P2 of second reference signals received in the second measurement time window is the same as or close to the quantity P1 of first reference signals received in the second measurement time window. In this case, a quantity of reporting bits of the first reference signal resource index may be the same as a quantity of reporting bits of the second reference signal resource index. In Solution 1, the quantity of reporting bits of the first reference signal resource index and the quantity of reporting bits of the second reference signal resource index are unified, thereby reducing reporting overheads of the user equipment.

Solution 2

The network device sends a third notification message to the user equipment, where the third notification message is used to indicate a second reference signal measurement subset used by the user equipment to perform channel quality measurement on the second reference signal, and the second reference signal measurement subset includes a part of the P2 second reference signals.

In one embodiment, when the first reference signal is a user-specific reference signal and the second reference signal is a cell-specific reference signal, a quantity of reporting bits of the first reference signal resource index is usually less than a quantity of reporting bits of the second reference signal resource index. Therefore, to unify the quantity of reporting bits of the first reference signal resource index and the quantity of reporting bits of the second reference signal resource index, the network device may instruct the user equipment to perform channel quality measurement on only a part of the received P2 second reference signals, so that a quantity of second reference signals on which channel quality measurement is performed is the same as or close to a quantity of first reference signals on which channel quality measurement is performed. In this case, the quantity of reporting bits of the second reference signal resource index may be the same as the quantity of reporting bits of the first reference signal resource index. In Solution 2, the quantity of reporting bits of the first reference signal resource index and the quantity of reporting bits of the second reference signal resource index are unified, thereby reducing reporting overheads of the user equipment.

In one embodiment, the network device may further send a fourth notification message to the user equipment, where the fourth notification message is used to indicate a reference signal type or a reference signal resource set index based on which power setting of the user equipment is performed.

In one embodiment, the fourth notification message may be used by the user equipment to set or adjust transmit power based on the reference signal type or the reference signal resource set index when the user equipment sends an uplink signal to the network device.

In one embodiment, the network device may further send indication information to the user equipment, where the indication information is used to indicate a reference signal type or a reference signal resource set index corresponding to a QCL assumption indication configured by the network device.

The QCL assumption indication may be used to assist in describing beamforming information on a receive side of the user equipment and a receiving procedure of the user equipment.

In one embodiment, when the reference signal type corresponding to the QCL assumption indication is a user-specific reference signal, the user equipment receives data based on shaped beams corresponding to the reported M1 first reference signals in a subsequent data receiving process. Otherwise, the user equipment receives data based on shaped beams corresponding to the reported M2 second reference signals.

In one embodiment, the receiving, by the network device, channel quality information of M reference signals that is reported by the user equipment specifically includes: receiving, by the network device, channel quality information of L reference signal resource index groups that is reported by the user equipment, where L≥1.

Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

In one embodiment, the user equipment may report the channel quality information corresponding to the M reference signal resource indexes through grouping, thereby reducing resource overheads for reporting the channel quality information corresponding to the M reference signal resource indexes.

In one embodiment, the network device may further receive the beam group types that are corresponding to the L reference signal resource index groups and that are reported by the user equipment.

According to one embodiment, this application provides a channel quality information reporting apparatus, and the apparatus includes a receiving unit, a processing unit, and a sending unit. The receiving unit is configured to receive P1 first reference signals sent by a network device on a first reference signal resource and P2 second reference signals sent by the network device on a second reference signal resource, where P1≥1 and P2≥1. The processing unit is configured to perform channel quality measurement on the first reference signal and the second reference signal. The sending unit is configured to report, to the network device, M reference signal resource indexes, channel quality information corresponding to the M reference signal resource indexes, and reference signal types or reference signal resource set indexes corresponding to the M reference signal resource indexes, where M≥1.

In one embodiment, the channel quality information corresponding to the reference signal resource index includes at least one of the following: reference signal received power and reference signal received quality.

In one embodiment, when reporting, to the network device, the M reference signal resource indexes, the channel quality information corresponding to the M reference signal resource indexes, and the reference signal types or the reference signal resource set indexes corresponding to the M reference signal resource indexes, the sending unit is specifically configured to: when a difference between channel quality corresponding to the first reference signal and channel quality corresponding to the second reference signal is greater than or equal to a first threshold, select M first reference signals from the P1 first reference signals, and report M first reference signal resource indexes, channel quality information corresponding to the M first reference signal resource indexes, and reference signal types or reference signal resource set indexes of the M first reference signals; or when a difference between channel quality corresponding to the second reference signal and channel quality corresponding to the first reference signal is greater than or equal to a second threshold, select M second reference signals from the P2 second reference signals, and report M second reference signal resource indexes, channel quality information corresponding to the M second reference signal resource indexes, and reference signal types or reference signal resource set indexes of the M second reference signals.

In one embodiment, the sending unit is further configured to report, to the network device, a reference signal type or a reference signal resource set index based on which power control of the user equipment is performed.

In one embodiment, when reporting, to the network device, the M reference signal resource indexes, the channel quality information corresponding to the M reference signal resource indexes, and the reference signal types or the reference signal resource set indexes corresponding to the M reference signal resource indexes, the sending unit is specifically configured to: select M1 first reference signals from the P1 first reference signals and select M2 second reference signals from the P2 second reference signals, where 1≤M1≤P1, 1≤M2≤P2, and M=M1+M2; and report the following information to the network device: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes.

In one embodiment, before the processing unit performs channel quality measurement on the first reference signal and the second reference signal, the receiving unit is further configured to: receive a first notification message sent by the network device, where the first notification message is used to indicate a first measurement time window in which the receiving unit receives the first reference signal; or receive a second notification message sent by the network device, where the second notification message is used to indicate a second measurement time window in which the receiving unit receives the second reference signal.

In one embodiment, before the processing unit performs channel quality measurement on the first reference signal and the second reference signal, the receiving unit is further configured to receive a third notification message sent by the network device, where the third notification message is used to indicate a second reference signal measurement subset used by the processing unit to perform channel quality measurement on the second reference signal, and the second reference signal measurement subset includes a part of the P2 second reference signals. When performing channel quality measurement on the second reference signal, the processing unit is specifically configured to perform channel quality measurement on the second reference signal measurement subset.

In one embodiment, the receiving unit is further configured to receive a fourth notification message sent by the network device, where the fourth notification message is used to indicate the reference signal type or the reference signal resource set index based on which power control of the apparatus is performed.

In one embodiment, the receiving unit is further configured to receive indication information sent by the network device, where the indication information is used to indicate a reference signal type or a reference signal resource set index corresponding to a QCL assumption indication configured by the network device.

In one embodiment, when reporting the channel quality information corresponding to the M reference signal resource indexes, the sending unit is specifically configured to report channel quality information of L reference signal resource index groups based on the channel quality information corresponding to the M reference signal resource indexes, where L≥1.

Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the receiving unit, and all shaped beams in a reference signal resource index group whose beam group type is the second type cannot be simultaneously received by the receiving unit.

In one embodiment, the sending unit is further configured to report, to the network device, the beam group types corresponding to the L reference signal resource index groups.

Based on a same inventive concept, for a problem-resolving principle and beneficial effects of the channel quality information reporting apparatus provided in the third aspect, refer to the method and the beneficial effects brought by the method provided in the first aspect or any design of the first aspect. Therefore, for implementation of the channel quality information reporting apparatus, refer to the implementation of the method. Repeated parts are not described.

According to one embodiment, this application provides a channel quality information reporting apparatus, and the apparatus includes a sending unit and a receiving unit.

The sending unit is configured to: send P1 first reference signals to user equipment on a first reference signal resource, and send P2 second reference signals to the user equipment on a second reference signal resource, where P1≥1, P2≥1, and the first reference signal and the second reference signal are used by the user equipment to perform channel quality measurement. The receiving unit is configured to receive the following information reported by the user equipment based on a channel quality measurement result: M reference signal resource indexes, channel quality information corresponding to the M reference signal resource indexes, and reference signal types or reference signal resource set indexes corresponding to the M reference signal resource indexes, where M≥1.

In one embodiment, the channel quality information corresponding to the reference signal resource index includes at least one of the following: reference signal received power and reference signal received quality.

In one embodiment, when receiving the following information reported by the user equipment based on the channel quality measurement result: the M reference signal resource indexes, the channel quality information corresponding to the M reference signal resource indexes, and the reference signal types or the reference signal resource set indexes corresponding to the M reference signal resource indexes, the receiving unit is specifically configured to: when a difference between channel quality corresponding to the first reference signal and channel quality corresponding to the second reference signal is greater than a first threshold, receive the following information reported by the user equipment based on the channel quality measurement result: M first reference signal resource indexes, channel quality information corresponding to the M first reference signal resource indexes, and reference signal types or reference signal resource set indexes corresponding to the M first reference signal resource indexes; or when a difference between channel quality corresponding to the second reference signal and channel quality corresponding to the first reference signal is greater than a second threshold, receive the following information reported by the user equipment based on the channel quality measurement result: M second reference signal resource indexes, channel quality information corresponding to the M second reference signal resource indexes, and reference signal types or reference signal resource set indexes corresponding to the M second reference signal resource indexes.

In one embodiment, the receiving unit is further configured to receive a reference signal type or a reference signal resource set index that is reported by the user equipment and on which a power control parameter of the user equipment is based.

In one embodiment, when receiving the following information reported by the user equipment: the M reference signal resource indexes, the channel quality information corresponding to the M reference signal resource indexes, and the reference signal types or the reference signal resource set indexes corresponding to the M reference signal resource indexes, the receiving unit is specifically configured to:

receive the following information reported by the user equipment: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes, where $1 \leq M1 \leq P1$, $1 \leq M2 \leq P2$, and $M=M1+M2$.

In one embodiment, the sending unit is further configured to: send a first notification message to the user equipment, where the first notification message is used to indicate a first measurement time window in which the user equipment receives the first reference signal; or send a second notification message to the user equipment, where the second notification message is used to indicate a second measurement time window in which the user equipment receives the second reference signal.

In one embodiment, the sending unit is further configured to send a third notification message to the user equipment, where the third notification message is used to indicate a second reference signal measurement subset used by the user equipment to perform channel quality measurement on the second reference signal, and the second reference signal measurement subset includes a part of the P2 second reference signals.

In one embodiment, the sending unit is further configured to send a fourth notification message to the user equipment, where the fourth notification message is used to indicate a reference signal type or a reference signal resource set index based on which power setting of the user equipment is performed.

In one embodiment, the sending unit is further configured to send indication information to the user equipment, where the indication information is used to indicate a reference signal type or a reference signal resource set index corresponding to a QCL assumption indication configured by the apparatus.

In one embodiment, when receiving channel quality information of M reference signals that is reported by the user equipment, the receiving unit is specifically configured to receive channel quality information of L reference signal resource index groups that is reported by the user equipment, where $L \geq 1$.

Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

In one embodiment, the receiving unit is further configured to receive the beam group types that are corresponding to the L reference signal resource index groups and that are reported by the user equipment.

Based on a same inventive concept, for a problem-resolving principle and beneficial effects of the channel quality information reporting apparatus provided in the fourth aspect, refer to the method and the beneficial effects brought by the method provided in the second aspect or any design of the second aspect. Therefore, for implementation of the channel quality information reporting apparatus, refer to the implementation of the method. Repeated parts are not described.

According one embodiment, this application provides a channel quality information reporting apparatus, and the apparatus includes a receiver, a processor, and a transmitter. The receiver is configured to receive P1 first reference signals sent by a network device on a first reference signal resource and P2 second reference signals sent by the network device on a second reference signal resource, where $P1 \geq 1$ and $P2 \geq 1$. The processor is configured to perform channel quality measurement on the first reference signal and the second reference signal. The transmitter is configured to report, to the network device, M reference signal resource indexes, channel quality information corresponding to the M reference signal resource indexes, and reference signal types or reference signal resource set indexes corresponding to the M reference signal resource indexes, where $M \geq 1$.

In one embodiment, the apparatus further includes a memory, the memory is configured to store a computer executable instruction, and the processor implements some or all functions of the apparatus by executing the computer executable instruction stored in the memory.

According one embodiment, this application provides a channel quality information reporting apparatus, and the apparatus includes a transmitter and a receiver. The transmitter is configured to: send P1 first reference signals to user equipment on a first reference signal resource, and send P2 second reference signals to the user equipment on a second reference signal resource, where $P1 \geq 1$, $P2 \geq 1$, and the first reference signal and the second reference signal are used by the user equipment to perform channel quality measurement. The receiver is configured to receive the following information reported by the user equipment based on a channel quality measurement result: M reference signal resource indexes, channel quality information corresponding to the M reference signal resource indexes, and reference signal types or reference signal resource set indexes corresponding to the M reference signal resource indexes, where M≥1.

In one embodiment, the apparatus further includes a memory, the memory is configured to store a computer executable instruction, and the processor implements some or all functions of the apparatus by executing the computer executable instruction stored in the memory.

According one embodiment, this application provides a computer readable storage medium. The computer readable storage medium stores an instruction, and when the instruction runs on a computer, the computer is enabled to perform the method provided in the first aspect or the possible designs of the first aspect, or the computer is enabled to perform the method provided in the second aspect or the possible designs of the second aspect.

According one embodiment, this application provides a computer program product including an instruction. When the computer program product runs on a computer, the computer is enabled to perform the method provided in the first aspect or the possible designs of the first aspect, or the computer is enabled to perform the method provided in the second aspect or the possible designs of the second aspect.

DESCRIPTION OF EMBODIMENTS

In a wireless communications system, a beamforming technology is a signal preprocessing technology based on an antenna array. A directional beam is generated by adjusting a weighting coefficient of each array element in the antenna array, to compensate for a propagation loss of a signal (especially a high frequency signal) in a propagation process by using a relatively large antenna gain.

During downlink signal transmission, a network device sends a downlink signal to user equipment on a directional shaped beam. Herein, the "directional shaped beam" is usually obtained in the following manner: The network device configures N (N>1) candidate shaped beams for the user equipment, and sends CSI-RSs to the user equipment on the N shaped beams. The user equipment performs channel quality measurement on the CSI-RSs on the N shaped beams, obtains T (N≥T≥1) shaped beams with better beam quality based on a measurement result, and reports the T shaped beams to the network device. The network device uses one of the reported T shaped beams as a serving shaped beam of the user equipment (namely, the "directional shaped beam"), and uses remaining shaped beams as alternative shaped beams of the user equipment.

In the foregoing manner of determining the serving shaped beam of the user equipment, because the N candidate shaped beams can cover only some specific directions in a cell, the user equipment may exceed a coverage range of the N shaped beams as the user equipment moves. In this case, when the user equipment performs channel quality measurement on the CSI-RSs on the N shaped beams, beam quality of N CSI-RSs is all poor and cannot meet a signal transmission requirement. Consequently, the user equipment cannot select a shaped beam with better beam quality through screening or report the shaped beam to the network device, thereby causing a communication link transmission failure.

This application provides a channel quality information reporting method and apparatus, to resolve a prior-art problem that a communication link transmission failure is caused due to movement of user equipment. The method and the apparatus are based on a same inventive concept. Problem-resolving principles of the method and the apparatus are similar. Therefore, for implementation of the apparatus and the method, mutual reference may be made, and repeated parts are not described.

Figure 1:
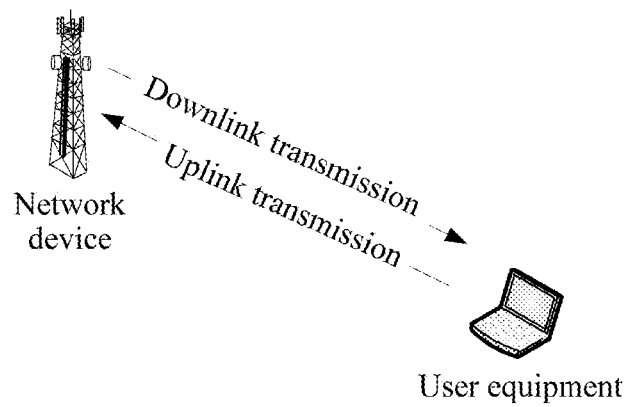
FIG. 1 is a schematic structural diagram of a wireless communications system according to an embodiment of this application.

The following first describes an application scenario of this application: In a wireless communications system shown in FIG. 1, in a downlink transmission process, a network device sends reference signals to user equipment on a plurality of candidate shaped beams. The user equipment performs channel quality measurement on the reference signals sent by the network device, selects one or more shaped beams with better beam quality from the plurality of candidate shaped beams based on a channel quality measurement result, and reports the selected one or more shaped beams to the network device in an uplink transmission process.

The network device in the embodiments of this application may be a network device (BTS, Base Transceiver Station) in a global system for mobile communications (Global System for Mobile Communications, GSM) or code division multiple access (Code Division Multiple Access, CDMA), or may be a network device (NodeB) in wideband code division multiple access (Wide-band Code Division Multiple Access, WCDMA), or may be an evolved network device (evolutional Node B, eNB, or e-NodeB) in LTE. This is not limited in the embodiments of this application.

The user equipment in the embodiments of this application may be a device that provides a user with voice and/or data connectivity, a handheld device corresponding to a wireless connection function, or another processing device connected to a wireless modem. The user equipment may communicate with one or more core networks through a radio access network (Radio Access Network, RAN). The user equipment may be a mobile terminal, such as a mobile phone (or referred to as a "cellular" phone) and a computer corresponding to a mobile terminal, for example, may be a portable, pocket-sized, handheld, computer built-in, or vehicle-mounted mobile apparatus, which exchanges voice and/or data with the radio access network. For example, the user equipment is a device such as a personal communications service (Personal Communication Service, PCS) phone, a cordless telephone set, a session initiation protocol (Session Initiated Protocol, SIP) phone, a wireless local loop (Wireless Local Loop, WLL) station, or a personal digital assistant (Personal Digital Assistant, PDA). The user equipment may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), or user equipment (User Equipment). This is not limited in the embodiments of this application.

To make the objectives, technical solutions, and advantages of this application clearer, the following further describes the embodiments of this application in detail with reference to the accompanying drawings.

Figure 2:
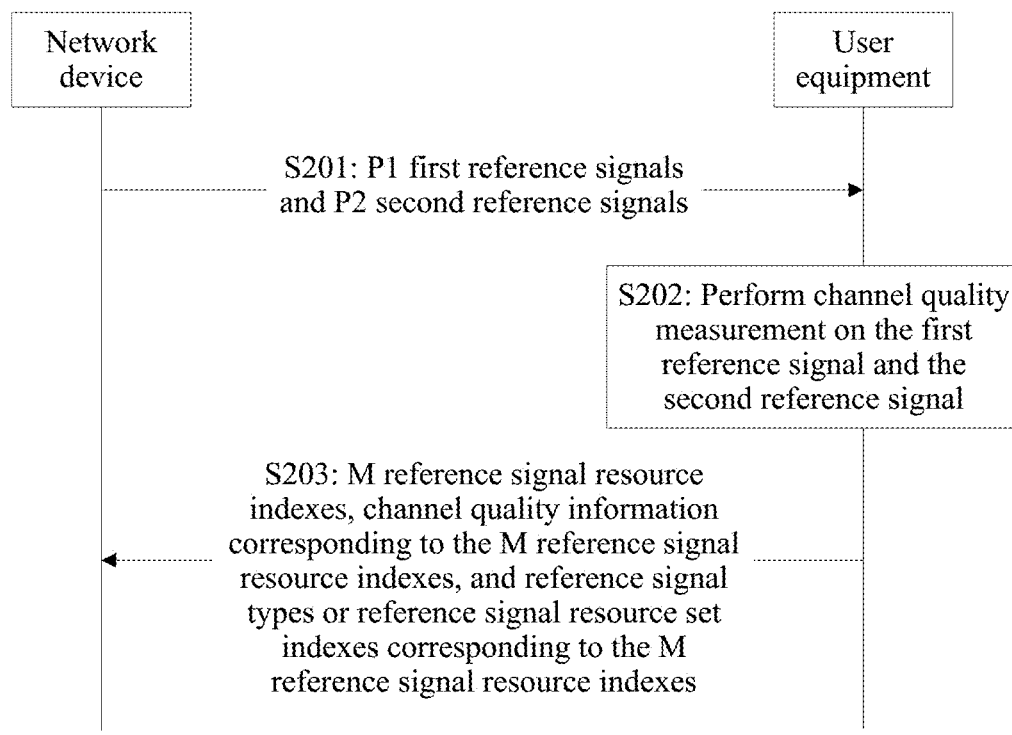
FIG. 2 is a schematic flowchart of a channel quality information reporting method according to an embodiment of this application.

FIG. 2 is a schematic flowchart of a channel quality information reporting method according to an embodiment of this application.

S201: A network device sends P1 first reference signals to user equipment on a first reference signal resource, and sends P2 second reference signals to the user equipment on a second reference signal resource.

$P1 \geq 1$ and $P2 \geq 1$.

In S201, the first reference signal resource corresponds to a plurality of shaped beams, and directions of the shaped beams are different. The network device sends the P1 first reference signals to the user equipment on the first reference signal resource, that is, sends the first reference signals to the user equipment in P1 different beam directions. Similarly, the second reference signal resource also corresponds to a plurality of shaped beams, and directions of the shaped beams are different. The network device sends the P2 second reference signals to the user equipment on the second reference signal resource, that is, sends the second reference signals to the user equipment in P2 different beam directions.

In this embodiment of this application, reference signals transmitted by using a beamforming technology include a cell-specific reference signal and a user-specific reference signal. The cell-specific reference signal can cover all directions in a cell, but the user-specific reference signal can cover only a specified direction in the cell. That is, all user equipment or a group of user equipment in the cell can receive the cell-specific reference signal, but only user equipment in the specified direction in the cell can receive the user-specific reference signal. For example, the cell-specific reference signal may be a channel or a signal in an SS block, such as a primary synchronization signal (Primary Synchronization Signal, PSS for short) or a secondary synchronization signal (Secondary Synchronization Signal, SSS for short). The user-specific reference signal may be a CSI-RS or a demodulation reference signal (Demodulation Reference Signal, DMRS). This is not limited herein.

In S201, the first reference signal may be a user-specific reference signal, and the second reference signal may be a cell-specific reference signal. When the first reference signal is a user-specific reference signal and the second reference signal is a cell-specific reference signal, user equipment in the specified direction in the cell can receive the first reference signal, and all user equipment or a group of user equipment in the cell can receive the second reference signal.

S202: The user equipment performs channel quality measurement on the received first reference signal and the received second reference signal.

When performing channel quality measurement on the first reference signal, the user equipment performs channel quality measurement on all the received P1 first reference signals. When performing channel quality measurement on the second reference signal, the user equipment performs channel quality measurement on all the received P2 second reference signals.

That the user equipment performs channel quality measurement on the P1 first reference signals is: the user equipment performs beam quality measurement on a candidate shaped beam corresponding to each of the P1 first reference signals, and based on a channel quality measurement result of the P1 first reference signals, the user equipment may determine beam quality of the P1 candidate shaped beams based on which the network device sends the P1 first reference signals. Similarly, that the user equipment performs channel quality measurement on the P2 second reference signals is: the user equipment performs beam quality measurement on a candidate shaped beam corresponding to each of the P2 second reference signals, and based on a channel quality measurement result of the P2 second reference signals, the user equipment may determine beam quality of the P2 candidate shaped beams based on which the network device sends the P2 second reference signals.

S203: The user equipment reports, to the network device, M reference signal resource indexes, channel quality information corresponding to the M reference signal resource indexes, and reference signal types or reference signal resource set indexes corresponding to the M reference signal resource indexes, where $M \geq 1$.

The channel quality information includes at least one of the following information: reference signal received power of a shaped beam and reference signal received quality of the shaped beam. In addition, the channel quality information may further include channel state information (Channel State Information, CSI), such as a rank indication (Rank Indication, RI), a channel quality indication (Channel Quality Indication, CQI), and a precoding matrix indication (Precoding Matrix Indication, PMI).

That the user equipment reports, to the network device, M reference signal resource indexes, channel quality information corresponding to the M reference signal resource indexes, and reference signal types or reference signal resource set indexes corresponding to the M reference signal resource indexes is: the user equipment selects M shaped beams with better beam quality from P1 candidate shaped beams (corresponding to the P1 first reference signals) and P2 candidate shaped beams (corresponding to the P2 second reference signals) based on a channel quality measurement result of the P1 first reference signals and the P2 second reference signals, and reports the M shaped beams to the network device.

When selecting the M shaped beams, the user equipment may select, based on channel quality information of the P1 first reference signals and channel quality information of the P2 second reference signals, a shaped beam with better beam quality in the P1 candidate shaped beams and/or a shaped beam with better beam quality in the P2 shaped beams (corresponding to the P1 first reference signals). For example, if the user equipment selects the M shaped beams from the P1 candidate shaped beams, and the reported channel quality information includes RSRP, the user equipment may select the M shaped beams with higher RSRP from the P1 candidate shaped beams. For another example, if the user equipment selects the M shaped beams from the P1 candidate shaped beams and the P2 candidate shaped beams, and the reported channel quality information includes RSRP, the user equipment may select M1 shaped beams with higher RSRP from the P1 candidate shaped beams, and then select M2 shaped beams with higher RSRP from the P2 candidate shaped beams, where $1 \leq M1 \leq P1$, $1 \leq M2 \leq P2$, and $M=M1+M2$. In other words, the M shaped beams may be considered as a set including the M1 shaped beams and the M2 shaped beams.

In S203, the reference signal types corresponding to the M reference signal resource indexes may be the first reference signal and/or the second reference signal, and the reference signal resource set indexes corresponding to the M reference signal resource indexes may be a first reference signal resource set index and/or a second reference signal resource set index. For example, the user equipment reports the reference signal types corresponding to the M reference signal resource indexes. When the reference signal types corresponding to the M reference signal resource indexes are the first reference signal, it indicates that the user equipment selects the M shaped beams with better beam quality from the P1 candidate shaped beams and reports the M shaped beams to the network device. When the reference signal types corresponding to the M reference signal resource indexes are the second reference signal, it indicates that the user equipment selects the M shaped beams with better beam quality from the P2 candidate shaped beams and reports the M shaped beams to the network device. When the reference signal types corresponding to the M reference signal resource indexes are the first reference signal and the second reference signal, it indicates that the user equipment selects the M1 shaped beams with better beam quality from the P1 candidate shaped beams and selects the M2 shaped beams with better beam quality from the P2 candidate shaped beams, where $M1+M2=M$, and then the user equipment reports the selected M shaped beams to the network device.

In this embodiment of this application, the user equipment receives the P1 first reference signals and the P2 second reference signals sent by the network device. Therefore, after the user equipment selects the M shaped beams from the P1 candidate shaped beams (corresponding to the P1 first reference signals) and/or the P2 candidate shaped beams (corresponding to the P2 second reference signals), when reporting the channel quality information corresponding to the M reference signal resource indexes, the user equipment should indicate, to the network device in one manner, which shaped beams are specifically the M shaped beams selected by the user equipment. The network device may determine, based on the reference signal types or the reference signal resource set indexes that are corresponding to the M reference signal resource indexes and that are reported by the user equipment, whether the M shaped beams are selected from the P1 candidate shaped beams or are selected from the P2 candidate shaped beams or are selected from the P1 candidate shaped beams and the P2 candidate shaped beams. Then, the network device may index the M shaped beams in the P1 candidate shaped beams, or the M shaped beams in the P2 candidate shaped beams, or the M1 shaped beams in the P1 candidate shaped beams and the M2 shaped beams in the P2 candidate shaped beams based on the M reference signal resource indexes reported by the user equipment, where $1 \leq M1 \leq P1$, $1 \leq M2 \leq P2$, and $M=M1+M2$.

For example, if the reference signal types that are corresponding to the M reference signal resource indexes and that are reported by the user equipment to the network device in S203 are the first reference signal, the network device may determine that the M shaped beams are selected from the P1 candidate shaped beams. Further, the network device may index the M shaped beams in the P1 candidate shaped beams based on the M reference signal resource indexes reported by the user equipment.

Further, the network device may select a reference signal with better channel quality based on the following information reported by the user equipment: the M reference signal resource indexes and the channel quality information corresponding to the M reference signal resource indexes, and configure a shaped beam corresponding to the reference signal with better channel quality as a serving shaped beam of the user equipment.

In S203, the user equipment may report, to the network device by using a physical uplink control channel (Physical Uplink Control Channel, PUCCH) or a physical uplink shared channel (Physical Uplink Shared Channel, PUSCH), the M reference signal resource indexes, the channel quality information corresponding to the M reference signal resource indexes, and the reference signal types or the reference signal resource set indexes corresponding to the M reference signal resource indexes.

According to the channel quality information reporting method shown in FIG. 2, the user equipment performs channel quality measurement on the P1 first reference signals and the P2 second reference signals sent by the network device, and reports, based on the channel quality measurement result, the M reference signal resource indexes, the channel quality information corresponding to the M reference signal resource indexes, and the reference signal types or the reference signal resource set indexes corresponding to the M reference signal resource indexes. Therefore, the network device may determine, based on the foregoing information reported by the user equipment, which shaped beams are specifically the M shaped beams selected by the user equipment from the P1 candidate shaped beams (corresponding to the P1 first reference signals) and/or the P2 candidate shaped beams (corresponding to the P2 second reference signals), and further use one of the M shaped beams as the serving shaped beam of the user equipment. When downlink transmission is subsequently performed, a downlink signal is sent to the user equipment on the serving shaped beam, to compensate for a propagation loss of a signal (especially a high frequency signal) in a propagation process by using a relatively large antenna gain.

In addition, in the method shown in FIG. 2, the user equipment reports the channel quality information based on two types of reference signals: the first reference signal and the second reference signal. In comparison with a solution in the prior art in which channel quality information is reported based on only a CSI-RS, when the user equipment moves beyond a coverage range of one specific type of reference signal (the first reference signal or the second reference signal), the user equipment can still select the M shaped beams with better beam quality based on the other type of reference signal (the second reference signal or the first reference signal) and report the M shaped beams. Therefore, in the method shown in FIG. 2, when the user equipment moves, the user equipment can still select a shaped beam with better beam quality through screening and report the shaped beam, thereby avoiding a communication link transmission failure.

In particular, when the first reference signal is a user-specific reference signal and the second reference signal is a cell-specific reference signal, because the cell-specific reference signal can cover all directions in the cell, regardless of a direction that is in the cell and to which the user equipment moves, the user equipment can select the M shaped beams with better beam quality from the P2 candidate shaped beams (corresponding to the P2 second reference signals) through screening and report the M shaped beams, thereby avoiding a communication link transmission failure.

Based on the foregoing description of the channel quality information reporting method in this embodiment of this application, in this embodiment of this application, the user equipment reports, to the network device in two manners, the M reference signal resource indexes, the channel quality information corresponding to the M reference signal resource indexes, and the reference signal types or the reference signal resource set indexes corresponding to the M reference signal resource indexes.

Manner 1: When a difference between channel quality corresponding to the first reference signal and channel quality corresponding to the second reference signal is greater than or equal to a first threshold, the user equipment selects M first reference signals from the P1 first reference signals, and reports M first reference signal resource indexes, channel quality information corresponding to the M first reference signal resource indexes, and reference signal types or reference signal resource set indexes of the M first reference signals. The first threshold herein is a real number greater than or equal to 0.

Alternatively, when a difference between channel quality corresponding to the second reference signal and channel quality corresponding to the first reference signal is greater than or equal to a second threshold, the user equipment selects M second reference signals from the P2 second reference signals, and reports M second reference signal resource indexes, channel quality information corresponding to the M second reference signal resource indexes, and reference signal types or reference signal resource set indexes of the M second reference signals. The second threshold herein is a real number greater than or equal to 0.

Manner 2: The user equipment selects M1 first reference signals from the P1 first reference signals and selects M2 second reference signals from the P2 second reference signals, where $1 \leq M1 \leq P1$, $1 \leq M2 \leq P2$, and $M=M1+M2$. Then, the user equipment reports the following information to the network device: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes.

The following separately describes the two reporting manners in detail.

First Reporting Manner

In the first reporting manner, the user equipment may specifically select the M shaped beams from the P1 candidate shaped beams (corresponding to the P1 first reference signals) or the P2 candidate shaped beams (corresponding to the P2 second reference signals) in the following manner: When the difference between the channel quality corresponding to the first reference signal and the channel quality corresponding to the second reference signal is greater than the first threshold (for example, 3 dB), the user equipment selects the M shaped beams from the P1 candidate shaped beams; or when the difference between the channel quality corresponding to the second reference signal and the channel quality corresponding to the first reference signal is greater than the second threshold, the user equipment selects the M shaped beams from the P2 candidate shaped beams.

The first threshold and the second threshold may be flexibly configured based on a specific requirement, and the first threshold may be the same as or different from the second threshold.

In the first reporting manner, the user equipment reports only a channel quality measurement result based on one type of reference signal, so that reporting overheads of the user equipment can be reduced.

In addition, the user equipment may further report, to the network device, a reference signal type or a reference signal resource set index based on which power control of the user equipment is performed. After learning of the reference signal type or the reference signal resource set index based on which power control of the user equipment is performed, the network device may further control transmit power of the user equipment.

Second Reporting Manner

In the second reporting manner, the user equipment may specifically select the M shaped beams from the P1 candidate shaped beams (corresponding to the P1 first reference signals) and the P2 candidate shaped beams (corresponding to the P2 second reference signals) in the following manner: The user equipment selects the M1 shaped beams from the P1 candidate shaped beams and selects the M2 shaped beams from the P2 candidate shaped beams based on configuration of the network device, where $1 \leq M1 \leq P1$, $1 \leq M2 \leq P2$, and $M=M1+M2$.

In the second reporting manner, the user equipment may report channel quality measurement results of two types of reference signals based on the configuration of the network device, to meet a configuration requirement of the network device.

In the second reporting manner, because the channel quality measurement results of the two types of reference signals should be reported, the user equipment may report the channel quality measurement results of the two types of reference signals based on a unified reporting format, to reduce reporting overheads of the user equipment.

A specific manner of unifying reporting formats may be: unifying a quantity of reporting bits of the first reference signal resource index and a quantity of reporting bits of the second reference signal resource index.

For example, if the first reference signal is a user-specific reference signal and the second reference signal is a cell-specific reference signal, a maximum quantity of candidate shaped beams supported by the first reference signal is fixed and is usually 8, but a maximum quantity of candidate shaped beams supported by the second reference signal dynamically changes with a carrier frequency of the second reference signal. Usually, when the carrier frequency of the second reference signal is less than 6 GHz, the maximum quantity of candidate shaped beams supported by the second reference signal is 8, and when the carrier frequency of the second reference signal is greater than 6 GHz, the maximum quantity of candidate shaped beams supported by the second reference signal is 64.

That is, for the first reference signal, when the first reference signal resource index is 3 bits, each of eight ($2^3$) candidate shaped beams may be indexed by using the first reference signal resource index. For the second reference signal, if the carrier frequency of the second reference signal is less than 6 GHz, when the second reference signal resource index is 3 bits, each of eight ($2^3$) candidate shaped beams may be indexed by using the second reference signal resource index. If the carrier frequency of the second reference signal is greater than 6 GHz, when the second reference signal resource index is 6 bits, each of 64 ($2^6$) candidate shaped beams may be indexed by using the second reference signal resource index. It may be learned from that, if the carrier frequency of the second reference signal is greater than 6 GHz, the quantity (3) of reporting bits of the first reference signal resource index is different from the quantity (6) of reporting bits of the second reference signal resource index.

It may be learned from the foregoing example that, if the second reporting manner is used, the quantity of reporting bits of the first reference signal resource index is different from the quantity of reporting bits of the second reference signal resource index. Therefore, in this application, the quantity of reporting bits of the first reference signal resource index and the quantity of reporting bits of the second reference signal resource index may be unified by using the following two solutions.

Solution 1

A specific manner of Solution 1 is as follows: The network device sends a first notification message to the user equipment, where the first notification message is used to indicate a first measurement time window in which the user equipment receives the first reference signal. Then, the user equipment performs channel quality measurement on the received first reference signal in the first measurement time window. Alternatively, the network device sends a second notification message to the user equipment, where the second notification message is used to indicate a second measurement time window in which the user equipment receives the second reference signal. Then, the user equipment performs channel quality measurement on the received second reference signal in the second measurement time window.

When the network device may indicate, by using the first notification message, the first measurement time window in which the user equipment receives the first reference signal, the user equipment may receive the first reference signal in the first measurement time window, so that the quantity P1 of first reference signals received in the first measurement time window is the same as or close to the quantity P2 of second reference signals received in the first measurement time window. In this case, the quantity of reporting bits of the first reference signal resource index may be the same as the quantity of reporting bits of the second reference signal resource index. For example, P1=P2=64. When both the first reference signal resource index and the second reference signal resource index are 6 bits, each of 64 ($2^6$) candidate shaped beams (corresponding to the P1 first reference signals) may be indexed by using the first reference signal resource index, and each of 64 ($2^6$) candidate shaped beams (corresponding to the P2 second reference signals) may be indexed by using the second reference signal resource index.

When the network device may indicate, by using the second notification message, the second measurement time window in which the user equipment receives the second reference signal, the user equipment may receive the second reference signal in the second measurement time window, so that the quantity P2 of second reference signals received in the second measurement time window is the same as or close to the quantity P1 of first reference signals received in the second measurement time window. In this case, the quantity of reporting bits of the first reference signal resource index may be the same as the quantity of reporting bits of the second reference signal resource index. For example, P1=P2=8. When both the first reference signal resource index and the second reference signal resource index are 3 bits, each of eight ($2^3$) candidate shaped beams (corresponding to the P1 first reference signals) may be indexed by using the first reference signal resource index, and each of eight ($2^3$) candidate shaped beams (corresponding to the P2 second reference signals) may be indexed by using the second reference signal resource index.

For example, if the first reference signal is a user-specific reference signal, the second reference signal is a cell-specific reference signal, and the carrier frequency of the second reference signal is greater than 6 GHz, the maximum quantity of candidate shaped beams supported by the first reference signal is 8, and the maximum quantity of candidate shaped beams supported by the second reference signal is 64. In this case, the network device may indicate, by using the first notification message, the first measurement time window in which the user equipment receives the first reference signal, and the user equipment performs, in the first measurement time window, channel quality measurement on first reference signals sent by the network device eight times, so that 8×8=64. In this case, the quantity of reporting bits of the first reference signal resource index is 6, and the quantity of reporting bits of the second reference signal resource index is also 6.

In Solution 1, the quantity of reporting bits of the first reference signal resource index and the quantity of reporting bits of the second reference signal resource index are unified, thereby reducing reporting overheads of the user equipment.

Solution 2

A specific manner of Solution 2 is as follows: The network device sends a third notification message to the user equipment, where the third notification message is used to indicate a measurement subset used by the user equipment to perform channel quality measurement on the second reference signal, and the measurement subset includes a part of the P2 second reference signals. In this case, when performing channel quality measurement on the second reference signal, the user equipment may perform channel quality measurement only on the measurement sub set.

When the first reference signal is a user-specific reference signal and the second reference signal is a cell-specific reference signal, the quantity of reporting bits of the first reference signal resource index is usually less than the quantity of reporting bits of the second reference signal resource index. Therefore, to unify the quantity of reporting bits of the first reference signal resource index and the quantity of reporting bits of the second reference signal resource index, the network device may instruct the user equipment to perform channel quality measurement on only a part of the received P2 second reference signals, so that a quantity of second reference signals on which channel quality measurement is performed is the same as or close to a quantity of first reference signals on which channel quality measurement is performed. In this case, the quantity of reporting bits of the second reference signal resource index may be the same as the quantity of reporting bits of the first reference signal resource index, for example, 3.

For example, if the first reference signal is a user-specific reference signal, the second reference signal is a cell-specific reference signal, and the carrier frequency of the second reference signal is greater than 6 GHz, the maximum quantity of candidate shaped beams supported by the first reference signal is 8, and the maximum quantity of candidate shaped beams supported by the second reference signal is 64. In this case, the network device indicates a second reference signal measurement subset by using the third notification message, and the measurement subset may include eight second reference signals. When both the first reference signal resource index and the second reference signal resource index are 3 bits, each of eight ($2^3$) candidate shaped beams (corresponding to eight first reference signals) may be indexed by using the first reference signal resource index, and each of eight ($2^3$) candidate shaped beams (corresponding to a measurement subset of eight second reference signals) may be indexed by using the second reference signal resource index.

In Solution 2, the quantity of reporting bits of the first reference signal resource index and the quantity of reporting bits of the second reference signal resource index are unified, thereby reducing reporting overheads of the user equipment.

In the second reporting manner, the network device may further send a fourth notification message to the user equipment, where the fourth notification message is used to indicate the reference signal type or the reference signal resource set index based on which power control of the user equipment is performed, so that the user equipment sets or adjusts transmit power based on the reference signal type or the reference signal resource set index when sending an uplink signal to the network device.

In addition, in the second reporting manner, the network device may further send indication information to the user equipment, where the indication information is used to indicate a reference signal type or a reference signal resource set index corresponding to a QCL assumption indication configured by the network device.

The QCL assumption indication may be used to assist in describing beamforming information on a receive side of the user equipment and a receiving procedure of the user equipment. When the reference signal type corresponding to the QCL assumption indication is a user-specific reference signal, the user equipment receives data based on shaped beams corresponding to the reported M1 first reference signals in a subsequent data receiving process. Otherwise, the user equipment receives data based on shaped beams corresponding to the reported M2 second reference signals.

A QCL assumption may include some spatial feature parameters, for example, parameters related to an angle of departure, such as a horizontal angle of departure (Azimuth angle of Departure, AoD), a vertical angle of departure (Zenith angle of Departure, ZoD), a horizontal angle spread of departure (Azimuth angle spread of Departure, ASD), and a vertical angle spread of departure (Zenith angle spread of Departure, ZSD), or parameters related to an angle of arrival, such as a horizontal angle of arrival (Azimuth angle of Arrival, AoA), a vertical angle of departure (Zenith angle of Arrival, ZoA), a horizontal angle spread of arrival (Azimuth angle spread of Arrival, ASA), and a vertical angle spread of arrival (Zenith angle spread of Arrival, ZSA). These spatial feature parameters describe spatial channel features of antenna ports on which the network device sends the P1 first reference signals and the P2 second reference signals, to assist in describing the beamforming information on the receive side of the user equipment and the receiving procedure of the user equipment. Optionally, the spatial feature parameters included in the QCL assumption may be parameters other than the foregoing parameters. This is not limited herein.

In addition, to reduce overheads of the QCL assumption indication sent by the network device to the user equipment, in the QCL assumption indication sent by the network device to the user equipment, a valid time window corresponding to the QCL assumption indication sent by the network device to the user equipment may be specified. One of M shaped beam pairs reported by the user equipment in S204 meets the QCL assumption.

The foregoing describes the two manners of reporting beam quality information in this embodiment of this application. When the channel quality information reporting method provided in this embodiment of this application is used, the foregoing two reporting manners may be selected based on an actual situation.

In addition, in this embodiment of this application, the user equipment may report the channel quality information corresponding to the M reference signal resource indexes through grouping. The user equipment reports channel quality information of L reference signal resource index groups based on the channel quality information corresponding to the M reference signal resource indexes, where $L \geq 1$.

Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

Specifically, when a maximum value of a difference between channel quality of reference signals belonging to a same panel in the M reference signals is less than a third threshold, the beam group types that are corresponding to the L reference signal resource index groups and that are reported by the user equipment are the second type, and RSRP of each of the L reference signal resource index groups is an average of RSRP of all reference signals included in the reference signal resource index group. When a maximum value of a difference between optimal channel quality of reference signals belonging to each panel in the M reference signals is less than a fourth threshold, the beam group types that are corresponding to the L reference signal resource index groups and that are reported by the user equipment are the first type, and RSRP of each of the L reference signal resource index groups is an average and/or a maximum value of RSRP of all reference signals included in the reference signal resource index group.

In addition, when the beam group types that are corresponding to the L reference signal resource index groups and that are reported by the user equipment are the first type, for each reference signal resource index group, in addition to a maximum value of RSRP of all reference signals included in the group, the user equipment may report a step index value of a difference between RSRP of another reference signal in the group and the maximum value, and a quantity of reference signals corresponding to the step index value. For example, if the maximum value of the RSRP of all the reference signals included in the reference signal resource index group is −46 dB, the user equipment may further report the following information: a quantity of reference signals corresponding to index=0 is 2, a quantity of reference signals corresponding to index=1 is 1, a quantity of reference signals corresponding to index=2 is 3, and a quantity of reference signals corresponding to index=3 is 1, where index=0 represents that a difference between RSRP of the reference signal and the maximum value −46 dB is −1 dB, index=1 represents that a difference between RSRP of the reference signal and the maximum value −46 dB is −2 dB, index=2 represents that a difference between RSRP of the reference signal and the maximum value −46 dB is −3 dB, and index=3 represents that a difference between RSRP of the reference signal and the maximum value −46 dB is −4 dB. An index is a step index value, and 2, 1, 3, or 1 is a quantity of reference signals corresponding to each step index value.

It should be noted that when reporting the channel quality information corresponding to the M reference signal resource indexes, the user equipment may report the channel quality information corresponding to the reference signal resource indexes through grouping, or may report channel quality information corresponding to each of the M reference signal resource indexes.

Figure 3:
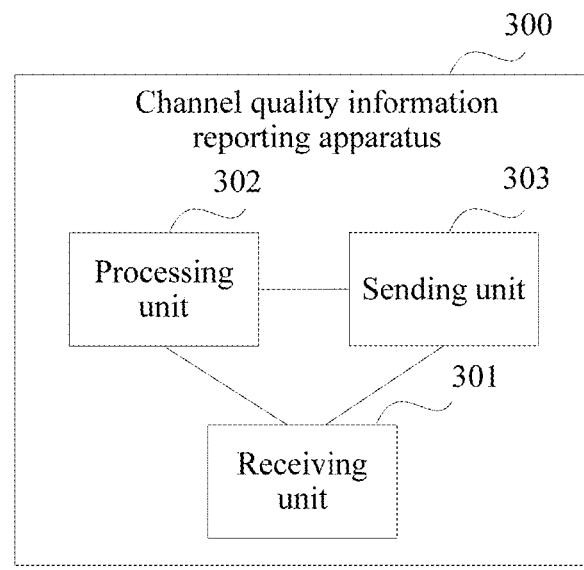
FIG. 3 is a schematic structural diagram of a first channel quality information reporting apparatus according to an embodiment of this application.

Based on the foregoing embodiment, this application further provides a channel quality information reporting apparatus, and the channel quality information reporting apparatus may be configured to perform the operations performed by the user equipment in the channel quality information reporting method shown in FIG. 2. Referring to FIG. 3, the channel quality information reporting apparatus 300 includes a receiving unit 301, a processing unit 302, and a sending unit 303.

The receiving unit 301 is configured to receive P1 first reference signals sent by a network device on a first reference signal resource and P2 second reference signals sent by the network device on a second reference signal resource, where P1≥1 and P2≥1.

The processing unit 302 is configured to perform channel quality measurement on the first reference signal and the second reference signal.

The sending unit 303 is configured to report, to the network device, M reference signal resource indexes, channel quality information corresponding to the M reference signal resource indexes, and reference signal types or reference signal resource set indexes corresponding to the M reference signal resource indexes, where M≥1.

In a possible design, the channel quality information corresponding to the reference signal resource index includes at least one of the following: reference signal received power and reference signal received quality.

In a possible design, when reporting, to the network device, the M reference signal resource indexes, the channel quality information corresponding to the M reference signal resource indexes, and the reference signal types or the reference signal resource set indexes corresponding to the M reference signal resource indexes, the sending unit 303 is specifically configured to: when a difference between channel quality corresponding to the first reference signal and channel quality corresponding to the second reference signal is greater than or equal to a first threshold, select M first reference signals from the P1 first reference signals, and report M first reference signal resource indexes, channel quality information corresponding to the M first reference signal resource indexes, and reference signal types or reference signal resource set indexes of the M first reference signals; or when a difference between channel quality corresponding to the second reference signal and channel quality corresponding to the first reference signal is greater than or equal to a second threshold, select M second reference signals from the P2 second reference signals, and report M second reference signal resource indexes, channel quality information corresponding to the M second reference signal resource indexes, and reference signal types or reference signal resource set indexes of the M second reference signals.

In a possible design, the sending unit 303 is further configured to report, to the network device, a reference signal type or a reference signal resource set index based on which power control of the user equipment is performed.

In a possible design, when reporting, to the network device, the M reference signal resource indexes, the channel quality information corresponding to the M reference signal resource indexes, and the reference signal types or the reference signal resource set indexes corresponding to the M reference signal resource indexes, the sending unit 303 is specifically configured to: select M1 first reference signals from the P1 first reference signals and select M2 second reference signals from the P2 second reference signals, where 1≤M1≤P1, 1≤M2≤P2, and M=M1+M2; and report the following information to the network device: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes.

In a possible design, before the processing unit 302 performs channel quality measurement on the first reference signal and the second reference signal, the receiving unit 301 is further configured to: receive a first notification message sent by the network device, where the first notification message is used to indicate a first measurement time window in which the receiving unit 301 receives the first reference signal; or receive a second notification message sent by the network device, where the second notification message is used to indicate a second measurement time window in which the receiving unit 301 receives the second reference signal.

In a possible design, before the processing unit 302 performs channel quality measurement on the first reference signal and the second reference signal, the receiving unit 301 is further configured to receive a third notification message sent by the network device, where the third notification message is used to indicate a second reference signal measurement subset used by the processing unit 302 to perform channel quality measurement on the second reference signal, and the second reference signal measurement subset includes a part of the P2 second reference signals. When performing channel quality measurement on the second reference signal, the processing unit 302 is specifically configured to perform channel quality measurement on the second reference signal measurement subset.

In a possible design, the receiving unit 301 is further configured to receive a fourth notification message sent by the network device, where the fourth notification message is used to indicate the reference signal type or the reference signal resource set index based on which power control of the apparatus is performed.

In a possible design, the receiving unit 301 is further configured to receive indication information sent by the network device, where the indication information is used to indicate a reference signal type or a reference signal resource set index corresponding to a QCL assumption indication configured by the network device.

In a possible design, when reporting the channel quality information corresponding to the M reference signal resource indexes, the sending unit 303 is specifically configured to report channel quality information of L reference signal resource index groups based on the channel quality information corresponding to the M reference signal resource indexes, where L≥1. Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the receiving unit 301, and all shaped beams in a reference signal resource index group whose beam group type is the second type cannot be simultaneously received by the receiving unit 301.

In a possible design, the sending unit 303 is further configured to report, to the network device, the beam group types corresponding to the L reference signal resource index groups.

It should be noted that, in this application, unit division is an example, and is merely logical function division. In actual implementation, another division manner may be used. Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

According to the channel quality information reporting apparatus 300 shown in FIG. 3, the processing unit 302 performs channel quality measurement on the P1 first reference signals and the P2 second reference signals sent by the network device, and the sending unit 303 reports, based on a channel quality measurement result, the M reference signal resource indexes, the channel quality information corresponding to the M reference signal resource indexes, and the reference signal types or the reference signal resource set indexes corresponding to the M reference signal resource indexes. Therefore, the network device may determine, based on the foregoing information reported by the channel quality information reporting apparatus 300, which shaped beams are specifically M shaped beams selected by the channel quality information reporting apparatus 300 from P1 candidate shaped beams (corresponding to the P1 first reference signals) and/or P2 candidate shaped beams (corresponding to the P2 second reference signals), and further use one of the M shaped beams as a serving shaped beam of the user equipment. When downlink transmission is subsequently performed, a downlink signal is sent to the channel quality information reporting apparatus 300 on the serving shaped beam, to compensate for a propagation loss of a signal (especially a high frequency signal) in a propagation process by using a relatively large antenna gain.

In addition, the channel quality information reporting apparatus 300 reports the channel quality information based on two types of reference signals: the first reference signal and the second reference signal. In comparison with a solution in the prior art in which channel quality information is reported based on only a CSI-RS, when the channel quality information reporting apparatus 300 moves beyond a coverage range of one specific type of reference signal (the first reference signal or the second reference signal), the channel quality information reporting apparatus 300 can still select the M shaped beams with better beam quality based on the other type of reference signal (the second reference signal or the first reference signal) and report the M shaped beams. Therefore, according to the channel quality information reporting apparatus 300, when the channel quality information reporting apparatus 300 moves, the channel quality information reporting apparatus 300 can still select a shaped beam with better beam quality through screening and report the shaped beam, thereby avoiding a communication link transmission failure.

In particular, when the first reference signal is a user-specific reference signal and the second reference signal is a cell-specific reference signal, because the cell-specific reference signal can cover all directions in a cell, regardless of a direction that is in the cell and to which the channel quality information reporting apparatus 300 moves, the channel quality information reporting apparatus 300 can select the M shaped beams with better beam quality from the P2 candidate shaped beams (corresponding to the P2 second reference signals) through screening and report the M shaped beams, thereby avoiding a communication link transmission failure.

It should be noted that the channel quality information reporting apparatus 300 may be configured to perform the operations performed by the user equipment in the channel quality information reporting method shown in FIG. 2. For an implementation that is not described in detail in the channel quality information reporting apparatus 300, refer to the related description in the channel quality information reporting method shown in FIG. 2.

Based on the foregoing embodiment, an embodiment of this application further provides a channel quality information reporting apparatus. The channel quality information reporting apparatus may perform the operations performed by the user equipment in the method provided in the embodiment corresponding to FIG. 2, and may be the same as the channel quality information reporting apparatus 300 shown in FIG. 3.

Figure 4:
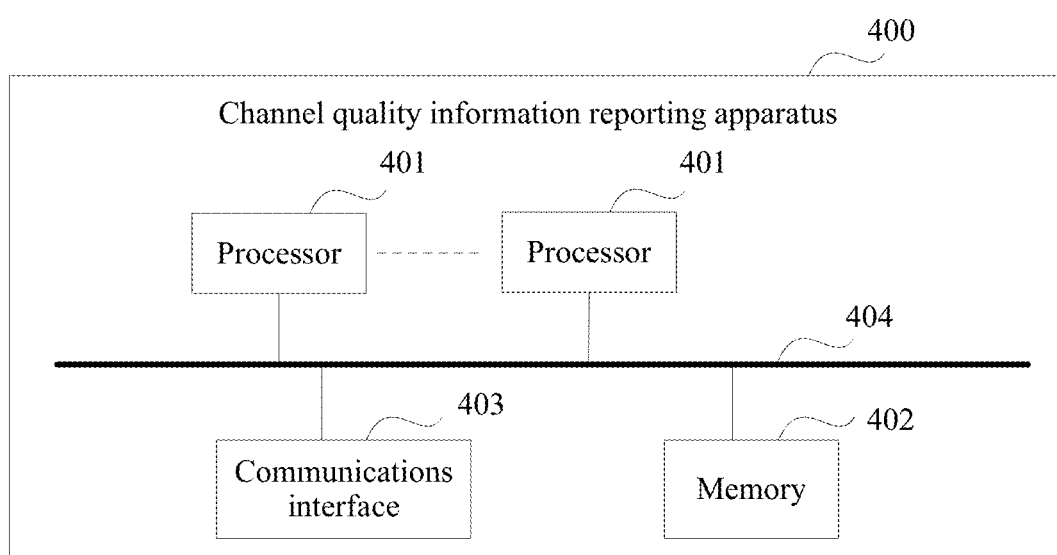
FIG. 4 is a schematic structural diagram of a second channel quality information reporting apparatus according to an embodiment of this application.

Referring to FIG. 4, a channel quality information reporting apparatus 400 includes at least one processor 401, a memory 402, and a communications interface 403. The at least one processor 401, the memory 402, and the communications interface 403 are all connected through a bus 404.

The memory 402 is configured to store a computer executable instruction.

The at least one processor 401 is configured to execute the computer executable instruction stored in the memory 402, so that the channel quality information reporting apparatus 400 exchanges data with another device (for example, a network device) in a communications system through the communications interface 403 to perform the channel quality information reporting method provided in the foregoing embodiment, or the channel quality information reporting apparatus 400 exchanges data with another device (for example, a network device) in a communications system through the communications interface 403 to implement some or all functions of the communications system.

The at least one processor 401 may include different types of processors 401, or include a same type of processor 401. The processor 401 may be any one of the following components with a calculation and processing capability: a central processing unit (Central Processing Unit, CPU for short), an ARM processor, a field programmable gate array (Field Programmable Gate Array, FPGA for short), a dedicated processor, and the like. In an optional implementation, the at least one processor 401 may be integrated as a many-core processor.

The memory 402 may be any one or any combination of the following storage media: a random access memory (Random Access Memory, RAM for short), a read-only memory (Read Only Memory, ROM for short), a non-volatile memory (non-volatile memory, NVM for short), a solid state drive (Solid State Drives, SSD for short), a mechanical hard disk, a magnetic disk, a disk array, and the like.

The communications interface 403 is configured to exchange data with the channel quality information reporting apparatus 400 and another device (for example, a network device in a communications system). The communications interface 403 may be any one or any combination of the following components with a network access function, such as a network interface (for example, an Ethernet interface) and a wireless network interface card.

The bus 404 may include an address bus, a data bus, a control bus, and the like. For ease of denotation, the bus is represented by using a thick line in FIG. 4. The bus 404 may be any one or any combination of the following components used for wired data transmission, such as an industry standard architecture (Industry Standard Architecture, ISA for short) bus, a peripheral component interconnect (Peripheral Component Interconnect, PCI for short) bus, and an extended industry standard architecture (Extended Industry Standard Architecture, EISA for short) bus.

Figure 5:
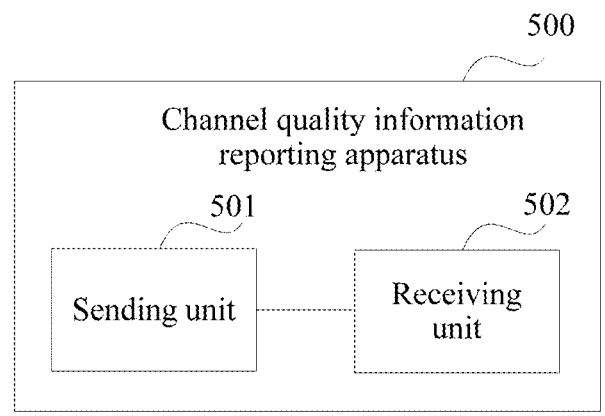
FIG. 5 is a schematic structural diagram of a third channel quality information reporting apparatus according to an embodiment of this application.

Based on the foregoing embodiment, this application further provides a channel quality information reporting apparatus, and the channel quality information reporting apparatus may be configured to perform the operations performed by the network device in the channel quality information reporting method shown in FIG. 2. Referring to FIG. 5, the channel quality information reporting apparatus 500 includes a sending unit 501 and a receiving unit 502.

The sending unit 501 is configured to: send P1 first reference signals to user equipment on a first reference signal resource, and send P2 second reference signals to the user equipment on a second reference signal resource, where P1≥1, P2≥1, and the first reference signal and the second reference signal are used by the user equipment to perform channel quality measurement.

The receiving unit 502 is configured to receive the following information reported by the user equipment based on a channel quality measurement result: M reference signal resource indexes, channel quality information corresponding to the M reference signal resource indexes, and reference signal types or reference signal resource set indexes corresponding to the M reference signal resource indexes, where M≥1.

In a possible design, the channel quality information corresponding to the reference signal resource index includes at least one of the following: reference signal received power and reference signal received quality.

In a possible design, when receiving the following information reported by the user equipment based on the channel quality measurement result: the M reference signal resource indexes, the channel quality information corresponding to the M reference signal resource indexes, and the reference signal types or the reference signal resource set indexes corresponding to the M reference signal resource indexes, the receiving unit 502 is specifically configured to: when a difference between channel quality corresponding to the first reference signal and channel quality corresponding to the second reference signal is greater than a first threshold, receive the following information reported by the user equipment based on the channel quality measurement result: M first reference signal resource indexes, channel quality information corresponding to the M first reference signal resource indexes, and reference signal types or reference signal resource set indexes corresponding to the M first reference signal resource indexes; or when a difference between channel quality corresponding to the second reference signal and channel quality corresponding to the first reference signal is greater than a second threshold, receive the following information reported by the user equipment based on the channel quality measurement result: M second reference signal resource indexes, channel quality information corresponding to the M second reference signal resource indexes, and reference signal types or reference signal resource set indexes corresponding to the M second reference signal resource indexes.

In a possible design, the receiving unit 502 is further configured to receive a reference signal type or a reference signal resource set index that is reported by the user equipment and on which a power control parameter of the user equipment is based.

In a possible design, when receiving the following information reported by the user equipment: the M reference signal resource indexes, the channel quality information corresponding to the M reference signal resource indexes, and the reference signal types or the reference signal resource set indexes corresponding to the M reference signal resource indexes, the receiving unit 502 is specifically configured to receive the following information reported by the user equipment: M1 first reference signal resource indexes and channel quality information corresponding to the M1 first reference signal resource indexes; reference signal types or reference signal resource set indexes corresponding to the M1 first reference signal resource indexes; M2 second reference signal resource indexes and channel quality information corresponding to the M2 second reference signal resource indexes; and reference signal types or reference signal resource set indexes corresponding to the M2 second reference signal resource indexes, where 1≤M1≤P1, 1≤M2≤P2, and M=M1+M2.

In a possible design, the sending unit 501 is further configured to: send a first notification message to the user equipment, where the first notification message is used to indicate a first measurement time window in which the user equipment receives the first reference signal; or send a second notification message to the user equipment, where the second notification message is used to indicate a second measurement time window in which the user equipment receives the second reference signal.

In a possible design, the sending unit 501 is further configured to send a third notification message to the user equipment, where the third notification message is used to indicate a second reference signal measurement subset used by the user equipment to perform channel quality measurement on the second reference signal, and the second reference signal measurement subset includes a part of the P2 second reference signals.

In a possible design, the sending unit 501 is further configured to send a fourth notification message to the user equipment, where the fourth notification message is used to indicate a reference signal type or a reference signal resource set index based on which power setting of the user equipment is performed.

In a possible design, the sending unit 501 is further configured to send indication information to the user equipment, where the indication information is used to indicate a reference signal type or a reference signal resource set index corresponding to a QCL assumption indication configured by the apparatus.

In a possible design, when receiving channel quality information of M reference signals that is reported by the user equipment, the receiving unit 502 is specifically configured to receive channel quality information of L reference signal resource index groups that is reported by the user equipment, where L≥1. Reference signal resource indexes included in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

In a possible design, the receiving unit 502 is further configured to receive the beam group types that are corresponding to the L reference signal resource index groups and that are reported by the user equipment.

According to the channel quality information reporting apparatus 500 shown in FIG. 5, the sending unit 501 sends the P1 first reference signals and the P2 second reference signals to the user equipment, and the user equipment may perform channel quality measurement on the P1 first reference signals and the P2 second reference signals, and report, based on the channel quality measurement result, the M reference signal resource indexes, the channel quality information corresponding to the M reference signal resource indexes, and the reference signal types or the reference signal resource set indexes corresponding to the M reference signal resource indexes. Therefore, the network device may determine, based on the foregoing information received by the receiving unit 502, which shaped beams are specifically M shaped beams selected by the user equipment from P1 candidate shaped beams (corresponding to the P1 first reference signals) and/or P2 candidate shaped beams (corresponding to the P2 second reference signals), and further use one of the M shaped beams as a serving shaped beam of the user equipment. When downlink transmission is subsequently performed, a downlink signal is sent to the user equipment on the serving shaped beam, to compensate for a propagation loss of a signal (especially a high frequency signal) in a propagation process by using a relatively large antenna gain.

In addition, the user equipment reports the channel quality information based on two types of reference signals: the first reference signal and the second reference signal. In comparison with a solution in the prior art in which channel quality information is reported based on only a CSI-RS, when the user equipment moves beyond a coverage range of one specific type of reference signal (the first reference signal or the second reference signal) sent by the channel quality information reporting apparatus 500, the user equipment can still select the M shaped beams with better beam quality based on the other type of reference signal (the second reference signal or the first reference signal) sent by the channel quality information reporting apparatus 500 and report the M shaped beams. Therefore, according to the channel quality information reporting apparatus 500, when the user equipment moves, the user equipment can still select a shaped beam with better beam quality through screening and report the shaped beam, thereby avoiding a communication link transmission failure.

In particular, when the first reference signal is a user-specific reference signal and the second reference signal is a cell-specific reference signal, because the cell-specific reference signal can cover all directions in a cell, regardless of a direction that is in the cell and to which the user equipment moves, the user equipment can select the M shaped beams with better beam quality from the P2 candidate shaped beams (corresponding to the P2 second reference signals) through screening and report the M shaped beams, thereby avoiding a communication link transmission failure.

It should be noted that the channel quality information reporting apparatus 500 may be configured to perform the operations performed by the network device in the channel quality information reporting method shown in FIG. 2. For an implementation that is not described in detail in the channel quality information reporting apparatus 500, refer to the related description in the channel quality information reporting method shown in FIG. 2.

Based on the foregoing embodiment, an embodiment of this application further provides a channel quality information reporting apparatus. The channel quality information reporting apparatus may perform the operations performed by the network device in the method provided in the embodiment corresponding to FIG. 2, and may be the same as the channel quality information reporting apparatus 500 shown in FIG. 5.

Figure 6:
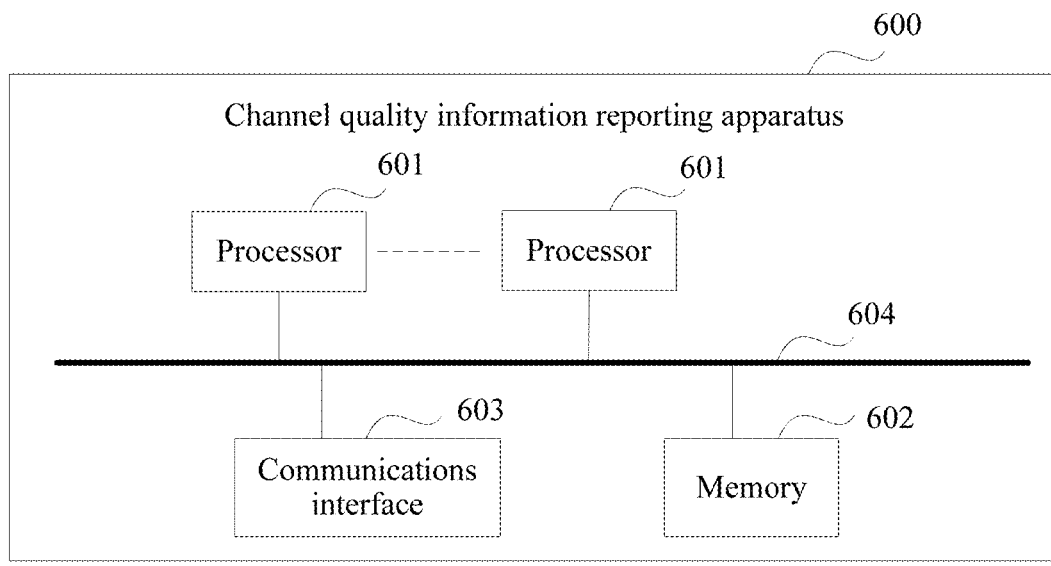
FIG. 6 is a schematic structural diagram of a fourth channel quality information reporting apparatus according to an embodiment of this application.

Referring to FIG. 6, a channel quality information reporting apparatus 600 includes at least one processor 601, a memory 602, and a communications interface 603. The at least one processor 601, the memory 602, and the communications interface 603 are all connected through a bus 604.

The memory 602 is configured to store a computer executable instruction.

The at least one processor 601 is configured to execute the computer executable instruction stored in the memory 602, so that the channel quality information reporting apparatus 600 exchanges data with another device (for example, user equipment) in a communications system through the communications interface 603 to perform the channel quality information reporting method provided in the foregoing embodiment, or the channel quality information reporting apparatus 600 exchanges data with another device (for example, user equipment) in a communications system through the communications interface 603 to implement some or all functions of the communications system.

The at least one processor 601 may include different types of processors 601, or include a same type of processor 601. The processor 601 may be any one of the following components with a calculation and processing capability: a CPU, an ARM processor, an FPGA, a dedicated processor, and the like. In an optional implementation, the at least one processor 601 may be integrated as a many-core processor.

The memory 602 may be any one or any combination of the following storage media: a RAM, a ROM, an NVM, an SSD, a mechanical hard disk, a magnetic disk, a disk array, and the like.

The communications interface 603 is configured to exchange data with the channel quality information reporting apparatus 600 and another device (for example, a network device in a communications system). The communications interface 603 may be any one or any combination of the following components with a network access function, such as a network interface (for example, an Ethernet interface) and a wireless network interface card.

The bus 604 may include an address bus, a data bus, a control bus, and the like. For ease of denotation, the bus is represented by using a thick line in FIG. 6. The bus 604 may be any one or any combination of the following components for wired data transmission: an ISA bus, a PCI bus, an EISA bus, and the like.

Figure 7:
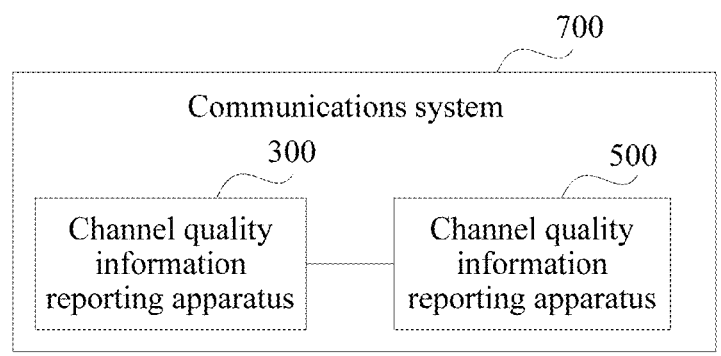
FIG. 7 is a schematic structural diagram of a communications system according to an embodiment of this application.

Based on the foregoing embodiment, this application further provides a communications system. Referring to FIG. 7, a communications system 700 includes the channel quality information reporting apparatus 300 shown in FIG. 3 and the channel quality information reporting apparatus 500 shown in FIG. 5.

In the communications system 700, the channel quality information reporting apparatus 300 may be configured to perform the operations performed by the user equipment in the channel quality information reporting method shown in FIG. 2, and the channel quality information reporting apparatus 500 may be configured to perform the operations performed by the network device in the channel quality information reporting method shown in FIG. 2.

In view of the above, according to the channel quality information reporting method and apparatus provided in the embodiments of this application, when the user equipment moves, the user equipment can still select a shaped beam with better beam quality through screening and report the shaped beam, thereby avoiding a communication link transmission failure.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and blocks are performed on the computer or the another programmable device, thereby generating computer-implemented processing. Therefore, the instructions executed on the computer or the another programmable device provide blocks for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
receiving, by user equipment, P1 first reference signals sent by a network device on a first reference signal resource and P2 second reference signals sent by the network device on a second reference signal resource, wherein P1≥1 and P2≥1, wherein the P1 first reference signals include a user-specific reference signal and the P2 second reference signals include a cell-specific reference signal;
performing, by the user equipment, channel quality measurement on the P1 first reference signals and the P2 second reference signals to select M shaped beams based at least on the user-specific reference signal and the cell-specific reference signal; and
reporting, by the user equipment to the network device, M reference signal resource indexes corresponding to the M shaped beams, channel quality information corresponding to the M reference signal resource indexes, and reference signal types or reference signal resource set indexes corresponding to the M reference signal resource indexes, wherein M≥1, wherein the reporting, by the user equipment to the network device, M reference signal resource indexes, channel quality information corresponding to the M reference signal resource indexes, and reference signal types or reference signal resource set indexes corresponding to the M reference signal resource indexes comprises:
selecting, by the user equipment, M1 first reference signals from the P1 first reference signals and selecting M2 second reference signals from the P2 second reference signals, wherein 1≤M1≤P1, 1≤M2≤P2, and M=M1+M2; and
reporting, by the user equipment, the following information to the network device:
M1 first reference signal resource indexes and channel quality information corresponding to the M1 first reference signal resource indexes;
reference signal types or reference signal resource set indexes corresponding to the M1 first reference signal resource indexes;
M2 second reference signal resource indexes and channel quality information corresponding to the M2 second reference signal resource indexes; and
reference signal types or reference signal resource set indexes corresponding to the M2 second reference signal resource indexes.

2. The method of claim 1, wherein the reporting, by the user equipment to the network device, M reference signal resource indexes, channel quality information corresponding to the M reference signal resource indexes, and reference signal types or reference signal resource set indexes corresponding to the M reference signal resource indexes comprises:
when a difference between channel quality corresponding to a first reference signal and channel quality corresponding to a second reference signal is greater than or equal to a first threshold, selecting, by the user equipment, M first reference signals from the P1 first reference signals, and reporting the M first reference signal resource indexes, channel quality information corresponding to the M first reference signal resource indexes, and reference signal types or reference signal resource set indexes of the M first reference signals; or when a difference between channel quality corresponding to a second reference signal and channel quality corresponding to a first reference signal is greater than or equal to a second threshold, selecting, by the user equipment, M second reference signals from the P2 second reference signals, and reporting the M second reference signal resource indexes, channel quality information corresponding to the M second reference signal resource indexes, and reference signal types or reference signal resource set indexes of the M second reference signals.

3. The method of claim 1, further comprising:
reporting, by the user equipment to the network device, a reference signal type or a reference signal resource set index based on which power control of the user equipment is performed.

4. The method of claim 1, wherein before the performing, by the user equipment, channel quality measurement on the P1 first reference signal and the P2 second reference signal, the method further comprises:
receiving, by the user equipment, a first notification message sent by the network device, wherein the first notification message indicates a first measurement time window in which the user equipment receives a first reference signal; or
receiving, by the user equipment, a second notification message sent by the network device, wherein the second notification message indicates a second measurement time window in which the user equipment receives a second reference signal.

5. The method of claim 1, wherein before the performing, by the user equipment, channel quality measurement on the P1 first reference signal and the P2 second reference signal, the method further comprises:
receiving, by the user equipment, a third notification message sent by the network device, wherein the third notification message indicates a second reference signal measurement subset used by the user equipment to perform channel quality measurement on a second reference signal, and the second reference signal measurement subset comprises a part of the P2 second reference signals; and
wherein the performing, by the user equipment, channel quality measurement on the second reference signal comprises: performing, by the user equipment, channel quality measurement on the second reference signal measurement subset.

6. The method of claim 1, further comprising:
receiving, by the user equipment, a fourth notification message sent by the network device, wherein the fourth notification message indicates the reference signal type or the reference signal resource set index based on which power control of the user equipment is performed.

7. The method of claim 1, further comprising:
receiving, by the user equipment, indication information sent by the network device, wherein the indication information indicates a reference signal type or a reference signal resource set index corresponding to a quasi-co-location (QCL) assumption indication configured by the network device.

8. A method, comprising:
receiving, by user equipment, P1 first reference signals sent by a network device on a first reference signal resource and P2 second reference signals sent by the network device on a second reference signal resource, wherein P1≥1 and P2≥1, wherein the P1 first reference signals include a user-specific reference signal and the P2 second reference signals include a cell-specific reference signal;
performing, by the user equipment, channel quality measurement on the P1 first reference signals and the P2 second reference signals to select M shaped beams based at least on the user-specific reference signal and the cell-specific reference signal; and
reporting, by the user equipment to the network device, M reference signal resource indexes corresponding to the M shaped beams, channel quality information corresponding to the M reference signal resource indexes, and reference signal types or reference signal resource set indexes corresponding to the M reference signal resource indexes, wherein M≥1 and wherein the reporting, by the user equipment, channel quality information corresponding to the M reference signal resource indexes comprises:
reporting, by the user equipment, channel quality information of L reference signal resource index groups based on the channel quality information corresponding to the M reference signal resource indexes, wherein L≥1, and
reference signal resource indexes in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

9. The method of claim 8, further comprising:
reporting, by the user equipment to the network device, the beam group types corresponding to the L reference signal resource index groups.

10. A channel quality information reporting method, comprising:
sending, by a network device, P1 first reference signals to user equipment on a first reference signal resource, and sending P2 second reference signals to the user equipment on a second reference signal resource, wherein P1≥1, P2≥1, and the P1 first reference signal and the P2 second reference signal are used by the user equipment to perform channel quality measurement, wherein the P1 first reference signals include a user-specific reference signal and the P2 second reference signals include a cell-specific reference signal; and
receiving, by the network device, the following information reported by the user equipment based on a channel quality measurement result: M reference signal resource indexes corresponding to M shaped beams, wherein the M shaped beams are selected by the user equipment based at least on the user-specific reference signal and the cell-specific reference signal, channel quality information corresponding to the M reference signal resource indexes, and reference signal types or reference signal resource set indexes corresponding to the M reference signal resource indexes, wherein M≥1, wherein the receiving, by the network device, the following information reported by the user equipment: M reference signal resource indexes, channel quality information corresponding to the M reference signal resource indexes, and reference signal types or reference signal resource set indexes corresponding to the M reference signal resource indexes comprises:

receiving, by the network device, the following information reported by the user equipment:

M1 first reference signal resource indexes and channel quality information corresponding to the M1 first reference signal resource indexes;

reference signal types or reference signal resource set indexes corresponding to the M1 first reference signal resource indexes;

M2 second reference signal resource indexes and channel quality information corresponding to the M2 second reference signal resource indexes; and reference signal types or reference signal resource set indexes corresponding to the M2 second reference signal resource indexes, wherein 1≤M1≤P1, 1≤M2≤P2, and M=M1+M2.

11. The method of claim 10, wherein the receiving, by the network device, the following information reported by the user equipment based on a channel quality measurement result: M reference signal resource indexes, channel quality information corresponding to the M reference signal resource indexes, and reference signal types or reference signal resource set indexes corresponding to the M reference signal resource indexes comprises:

when a difference between channel quality corresponding to a first reference signal and channel quality corresponding to a second reference signal is greater than a first threshold, receiving, by the network device, the following information reported by the user equipment based on the channel quality measurement result: M first reference signal resource indexes, channel quality information corresponding to the M first reference signal resource indexes, and reference signal types or reference signal resource set indexes corresponding to the M first reference signal resource indexes; or when a difference between channel quality corresponding to a second reference signal and channel quality corresponding to a first reference signal is greater than a second threshold, receiving, by the network device, the following information reported by the user equipment based on the channel quality measurement result: M second reference signal resource indexes, channel quality information corresponding to the M second reference signal resource indexes, and reference signal types or reference signal resource set indexes corresponding to the M second reference signal resource indexes.

12. The method of claim 11, further comprising:

receiving, by the network device, a reference signal type or a reference signal resource set index that is reported by the user equipment and on which a power control parameter of the user equipment is based.

13. The method of claim 10, further comprising:

sending, by the network device, a first notification message to the user equipment, wherein the first notification message is used to indicate a first measurement time window in which the user equipment receives a first reference signal; or sending, by the network device, a second notification message to the user equipment, wherein the second notification message is used to indicate a second measurement time window in which the user equipment receives a second reference signal.

14. The method of claim 10, further comprising:

sending, by the network device, a third notification message to the user equipment, wherein the third notification message is used to indicate a second reference signal measurement subset used by the user equipment to perform channel quality measurement on a second reference signal, and the second reference signal measurement subset comprises a part of the P2 second reference signals.

15. The method of claim 10, further comprising:

sending, by the network device, a fourth notification message to the user equipment, wherein the fourth notification message is used to indicate a reference signal type or a reference signal resource set index based on which power setting of the user equipment is performed.

16. The method of claim 10, further comprising:

sending, by the network device, indication information to the user equipment, wherein the indication information is used to indicate a reference signal type or a reference signal resource set index corresponding to a QCL assumption indication configured by the network device.

17. A channel quality information reporting method, comprising:

sending, by a network device, P1 first reference signals to user equipment on a first reference signal resource, and sending P2 second reference signals to the user equipment on a second reference signal resource, wherein P1≥1, P2≥1, and the P1 first reference signal and P2 the second reference signal are used by the user equipment to perform channel quality measurement, wherein the P1 first reference signals include a user-specific reference signal and the P2 second reference signals include a cell-specific reference signal; and receiving, by the network device, the following information reported by the user equipment based on a channel quality measurement result: M reference signal resource indexes corresponding to M shaped beams, wherein the M shaped beams are selected by the user equipment based at least on the user-specific reference signal and the cell-specific reference signal, channel quality information corresponding to the M reference signal resource indexes, and reference signal types or reference signal resource set indexes corresponding to the M reference signal resource indexes, wherein M≥1 and wherein the receiving, by the network device, channel quality information of M reference signals that is reported by the user equipment specifically comprises:

receiving, by the network device, channel quality information of L reference signal resource index groups that is reported by the user equipment, wherein L≥1, and reference signal resource indexes in all of the L reference signal resource index groups jointly constitute the M reference signal resource indexes, beam group types corresponding to the L reference signal resource index groups are a first type or a second type, all shaped beams in a reference signal resource index group whose beam group type is the first type can be simultaneously received by the user equipment, and all shaped beams in a reference signal resource index group whose beam group type is the second type cannot be simultaneously received by the user equipment.

18. A channel quality information reporting apparatus, comprising:

a receiving unit, configured to receive P1 first reference signals sent by a network device on a first reference signal resource and P2 second reference signals sent by the network device on a second reference signal resource, wherein P1≥1 and P2≥1, wherein the P1 first reference signals include a user-specific reference signal and the P2 second reference signals include a cell-specific reference signal;

a processing unit, configured to perform channel quality measurement on the P1 first reference signals and the P2 second reference signals to select M shaped beams based at least on the user-specific reference signal and the cell-specific reference signal; and a sending unit, configured to report, to the network device, M reference signal resource indexes corresponding to the M shaped beams, channel quality information corresponding to the M reference signal resource indexes, and reference signal types or reference signal resource set indexes corresponding to the M reference signal resource indexes, wherein M≥1 and wherein the reporting to the network device, M reference signal resource indexes, channel quality information corresponding to the M reference signal resource indexes, and reference signal types or reference signal resource set indexes corresponding to the M reference signal resource indexes comprises:

selecting M1 first reference signals from the P1 first reference signals and selecting M2 second reference signals from the P2 second reference signals, wherein 1≤M1≤P1, 1≤M2≤P2, and M=M1+M2; and reporting the following information to the network device:

M1 first reference signal resource indexes and channel quality information corresponding to the M1 first reference signal resource indexes;

reference signal types or reference signal resource set indexes corresponding to the M1 first reference signal resource indexes;

M2 second reference signal resource indexes and channel quality information corresponding to the M2 second reference signal resource indexes; and reference signal types or reference signal resource set indexes corresponding to the M2 second reference signal resource indexes.

\* \* \* \* \*